(12) United States Patent
Misawa et al.

(10) Patent No.: US 10,761,407 B2
(45) Date of Patent: Sep. 1, 2020

(54) SETTING DEVICE AND CAMERA

(71) Applicant: FUJIFILM Corporation, Tokyo (JP)

(72) Inventors: Atsushi Misawa, Saitama (JP); Kentaro Tokiwa, Saitama (JP); Hirofumi Horii, Saitama (JP); Yuichi Fujimura, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/185,580

(22) Filed: Nov. 9, 2018

(65) Prior Publication Data

US 2019/0079372 A1 Mar. 14, 2019

Related U.S. Application Data

(63) Continuation of application No. PCT/JP2017/014065, filed on Apr. 4, 2017.

(30) Foreign Application Priority Data

Jun. 10, 2016 (JP) .................. 2016-116297

(51) Int. Cl.
*G03B 17/18* (2006.01)
*H04N 5/232* (2006.01)
(Continued)

(52) U.S. Cl.
CPC ............. *G03B 17/18* (2013.01); *G03B 17/02* (2013.01); *H04N 5/2252* (2013.01);
(Continued)

(58) Field of Classification Search
None
See application file for complete search history.

(56) References Cited

U.S. PATENT DOCUMENTS

| | | | |
|---|---|---|---|
| 2012/0009896 | A1 | 1/2012 | Bandyopadhyay et al. |
| 2012/0154301 | A1 | 6/2012 | Kang et al. |

(Continued)

FOREIGN PATENT DOCUMENTS

| | | |
|---|---|---|
| CN | 101856992 A | 10/2010 |
| CN | 102402380 A | 4/2012 |

(Continued)

OTHER PUBLICATIONS

International Preliminary Report on Patentability and Written Opinion of the International Searching Authority (forms PCT/IB/373, PCT/ISA/237 and PCT/IB/326), dated Dec. 20, 2018, for corresponding International Application No. PCT/JP2017/014065, with a Written Opinion translation.

(Continued)

*Primary Examiner* — Kenneth B Lee, Jr.
(74) *Attorney, Agent, or Firm* — Birch, Stewart, Kolasch & Birch, LLP

(57) ABSTRACT

Provided are a setting device and a camera that are capable of preventing erroneous operations with compact configurations and have high operability. A display section is provided on an upper surface of a shutter speed dial. The display section displays settable shutter speeds and an image picture of a lock button. A touch sensor detects contact with the upper surface of the shutter speed dial, and switching of the shutter speed by the shutter speed dial is locked and unlocked every time the contact is detected.

20 Claims, 25 Drawing Sheets

(51) Int. Cl.
  *G03B 17/02*  (2006.01)
  *H04N 5/225*  (2006.01)
(52) U.S. Cl.
  CPC ......... *H04N 5/232* (2013.01); *H04N 5/23216* (2013.01); *H04N 5/232935* (2018.08); *H04N 5/232939* (2018.08)

(56) References Cited

U.S. PATENT DOCUMENTS

| | | | |
|---|---|---|---|
| 2014/0103803 A1 | 4/2014 | Hardy et al. | |
| 2014/0143785 A1 | 5/2014 | Mistry et al. | |
| 2016/0028938 A1* | 1/2016 | Fukushima | H04N 5/2254 |
| | | | 348/349 |
| 2016/0079016 A1* | 3/2016 | Matsuda | H01H 25/065 |
| | | | 200/4 |

FOREIGN PATENT DOCUMENTS

| | | |
|---|---|---|
| CN | 202229911 U | 5/2012 |
| JP | 7-134320 A | 5/1995 |
| JP | 2001-83559 A | 3/2001 |
| JP | 2002-277919 A | 9/2002 |
| JP | 2008-165118 A | 7/2008 |
| JP | 2010-192223 A | 9/2010 |
| JP | 2012-189883 A | 10/2012 |
| JP | 2014-202837 A | 10/2014 |
| JP | 2015-125307 A | 7/2015 |
| JP | 2016-24360 A | 2/2016 |
| WO | WO 2014/188855 A1 | 11/2014 |

OTHER PUBLICATIONS

International Search Report (form PCT/ISA/210), dated May 16, 2017, for corresponding International Application No. PCT/JP2017/014065, with an English translation.

Chinese Office Action and Search Report, dated May 29, 2020, for corresponding Chinese Application No. 201780029573.9, with an English translation of the Chinese Office Action.

* cited by examiner

FIG. 8

| | SHUTTER SPEED | DISPLAY ON DISPLAY SECTION |
|---|---|---|
| 1 | AUTO | A |
| 2 | BULB | B |
| 3 | TIME | T |
| 4 | 1 SECOND | 1 |
| 5 | 1/2 SECOND | 2 |
| 6 | 1/4 SECOND | 4 |
| 7 | 1/8 SECOND | 8 |
| 8 | 1/15 SECOND | 15 |
| 9 | 1/30 SECOND | 30 |
| 10 | 1/60 SECOND | 60 |
| 11 | 1/125 SECOND | 125 |
| 12 | 1/180 SECOND | 180 |
| 13 | 1/250 SECOND | 250 |
| 14 | 1/500 SECOND | 500 |
| 15 | 1/1000 SECOND | 1000 |
| 16 | 1/2000 SECOND | 2000 |
| 17 | 1/4000 SECOND | 4000 |

SETTING DEVICE AND CAMERA

CROSS-REFERENCE TO RELATED APPLICATIONS

This application is a Continuation of PCT International Application No. PCT/JP2017/014065 filed on Apr. 4, 2017, which claims priority under 35 U.S.C § 119(a) to Japanese Patent Application No. 2016-116297 filed on Jun. 10, 2016. Each of the above application(s) is hereby expressly incorporated by reference, in its entirety, into the present application.

BACKGROUND OF THE INVENTION

1. Field of the Invention

The present invention relates to a setting device and a camera, and particularly to a setting device that uses a rotary operation dial and a camera that comprises the setting device.

2. Description of the Related Art

Since a setting device that uses a rotary operation dial can be intuitively operated and the set state of the setting device can also be confirmed at a glance, the setting device is employed in a lot of apparatuses. From a long time ago, the setting device that uses the rotary operation dial has been used particularly in a camera as means for setting various imaging conditions (for example, shutter speed, sensitivity, exposure correction value, imaging mode, or the like).

JP2008-165118A discloses a setting device comprising a display section on an upper surface of an operation dial as this type of the setting device. In the setting device of JP2008-165118A, a display on the display section is switched in response to a rotation operation of the operation dial. JP2014-202837A discloses a setting device comprising a display section and a touch panel on the upper surface of an operation dial. In the setting device of JP2014-202837A, an item displayed on the display section is switched by a touch operation on the touch panel.

There may be a case where this type of the setting device comprises a mechanism for preventing a setting from being changed unintentionally. For example, JP1995-134320A (JP-H07-134320A) and JP2015-125307A disclose setting devices comprising mechanisms that mechanically lock operation dials. Further, JP2002-277919A discloses a setting device comprising means for prohibiting a change in a setting such that the setting is not changed even in a case where an operation dial is rotationally operated.

SUMMARY OF THE INVENTION

However, in the case where the mechanisms that mechanically lock the operation dials are provided as disclosed in JP1995-134320A and JP2015-125307A, there are disadvantages that structures of the operation dials become complicated. Since an object of the operation dial comprising the display section on the upper surface particularly is to simplify the mechanism by digitization so as not to be broken or to lower the cost, there is a disadvantage that the contribution of digitization is lost in the case where the structure of the operation dial becomes complicated by adding the mechanism that mechanically locks the operation dial.

As disclosed in JP2002-277919A, in the case where the means for prohibiting the change in the setting is provided separately from the operation dial and the change in the setting by the operation dial is prohibited, there is a disadvantage that operability is reduced.

The invention has been made in consideration of the above-mentioned circumstances, and an object of the invention is to provide a setting device and a camera that are capable of preventing erroneous operations with compact configurations and have high operability.

Means for achieving the above-mentioned object are as follows.

(1) A setting device comprising:
an operation dial that is rotatable;
a display section that is provided on an upper surface of the operation dial;
a contact detection unit that detects contact with the upper surface of the operation dial;
a lock state switching unit that alternately switches between a locked state and an unlocked state every time the contact with the upper surface of the operation dial is detected;
a rotation detection unit that detects a rotation of the operation dial;
a setting switching unit that sequentially switches a setting according to the rotation of the operation dial only in a case of the unlocked state; and
a display control unit that controls a display of the display section and displays an image picture of a lock button and a currently selected setting.

According to the embodiment, the setting is sequentially switched by rotationally operating the operation dial. The display section is provided on the upper surface of the operation dial. The display section displays the currently selected setting. In the case where the operation dial is rotationally operated to switch the setting, the display on the display section is also switched. Therefore, a desired setting can be achieved by rotationally operating the operation dial while the display section is viewed.

Further, according to the embodiment, the locked state and the unlocked state can be switched by touching by a finger on the upper surface of the operation dial. That is, the locked state and the unlocked state are alternately switched every time the finger touches the upper surface thereof. The switching of the setting is allowed only in the case of the unlocked state. In the locked state, the setting cannot be switched even in a case where the operation dial is rotated. In a case where the unlocked state is set and the operation dial is rotated, the setting is sequentially switched. The display is also switched according to the switching of the setting. In this manner, it is possible to simplify a structure of the operation dial by electronically locking and unlocking. In particular, it is possible to provide an operation dial having a structure that is compact as a whole and hard to break and having high operability in combination with the digitization of the display section on the upper surface of the operation dial.

(2) The setting device according to (1),
wherein the contact detection unit detects a contact with a display section of the image picture of the lock button.

According to the embodiment, in the case where the contact with the upper surface of the operation dial is detected, the contact with a portion that displays the image picture of the lock button is detected. Accordingly, it is possible to switch between the locked state and the unlocked state by touching the lock button.

(3) The setting device according to (1) or (2),
wherein the contact detection unit has a detection region corresponding to a display region of the image picture of the lock button.

According to the embodiment, the contact detection unit has the detection region corresponding to the display region of the image picture of the lock button. The detection region corresponding to the display region of the image picture of the lock button means that a region where the image picture of the lock button is displayed is set as the detection region of the contact.

(4) The setting device according to any one of (1) to (3),
wherein the display control unit switches a display form of the display section between the locked state and the unlocked state.

According to the embodiment, the display form of the display section can be switched between the locked state and the unlocked state. Any switching of the display form may be employed as long as it is possible to distinguish between the locked state and the unlocked state. For example, the switching of a display color of the display section between the locked state and the unlocked state, the switching of brightness of the display section between the locked state and the unlocked state, turning on and off of the display in the case of the locked state, or the like may be exemplified.

(5) The setting device according to (4),
wherein the display control unit switches the image picture of the lock button between the locked state and the unlocked state.

According to the embodiment, the display form of the image picture of the lock button can be switched between the locked state and the unlocked state. Any switching of the display form may be employed as long as it is possible to distinguish between the locked state and the unlocked state. For example, the switching of a color of the image picture of the lock button between the locked state and the unlocked state, displaying of a character of "LOCK" in the image picture of the lock button in the case of the locked state, turning on and off of the image picture of the lock button in the case of the locked state, or the like may be exemplified.

(6) The setting device according to (5),
wherein the display control unit switches a color of the image picture of the lock button between the locked state and the unlocked state.

According to the embodiment, the color of the image picture of the lock button can be switched between the locked state and the unlocked state. For example, the color of the image picture of the lock button is inverted between the locked state and the unlocked state.

(7) The setting device according to any one of (1) to (6),
wherein the display control unit controls the display section so as to display the image picture of the lock button on a rotation center of the operation dial and to display the currently selected setting at a current setting display position.

According to the embodiment, the display section displays the image picture of the lock button on the rotation center of the operation dial.

(8) The setting device according to (7),
wherein the display control unit displays the currently selected setting displayed at the current setting display position and selectable settings side by side on the same circumference.

According to the embodiment, the currently selected setting displayed at the current setting display position and the selectable settings are displayed side by side on the same circumference.

(9) The setting device according to (7) or (8),
wherein the display control unit displays the currently selected setting displayed at the current setting display position larger than other selectable settings.

According to the embodiment, the currently selected setting displayed at the current setting display position is displayed larger than other selectable settings.

(10) A camera comprising:
the setting device according to any one of (1) to (9).

According to the embodiment, the camera comprises the setting device according to any one of (1) to (9).

(11) The camera according to (10), further comprising:
a sound output unit that notifies by a sound that the locked state is set in a case where the operation dial is rotated in a case of the locked state.

According to the embodiment, it is possible to notify the user that the locked state is set by the sound.

(12) The camera according to (10), further comprising:
a monitor that displays that the locked state is set in a case of the locked state.

According to the embodiment, it is possible to notify the user that the locked state is set by the display.

According to the invention, it is possible to provide the setting device and the camera that are capable of preventing the erroneous operations with the compact configurations and have high operability.

BRIEF DESCRIPTION OF THE DRAWINGS

FIG. 8 is a list of settable shutter speeds and notations of the shutter speeds on a display section.

DESCRIPTION OF THE PREFERRED EMBODIMENTS

A preferred embodiment of the invention will be described in detail below with reference to accompanying drawings.

«Appearance»

Figure 1:
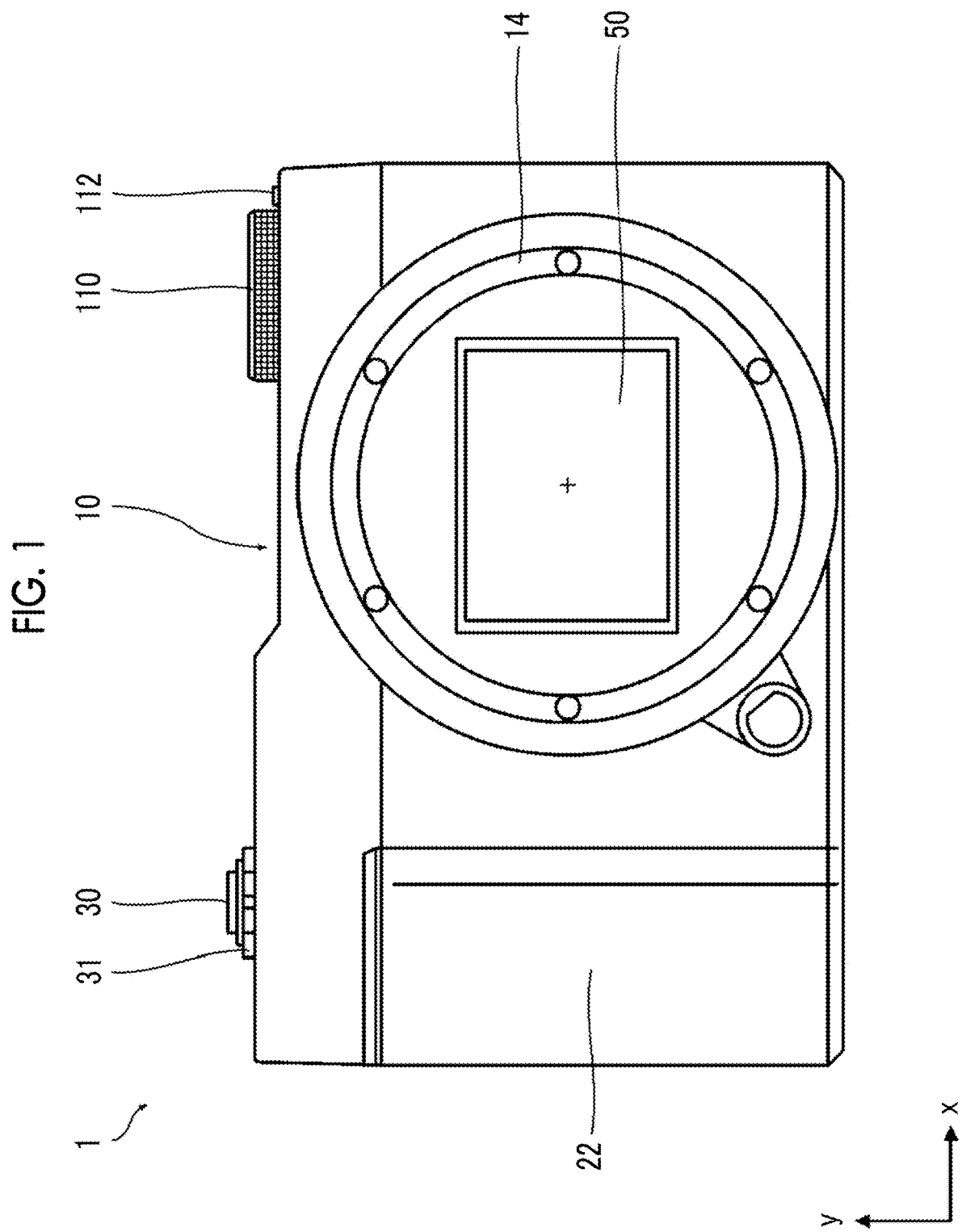
FIG. 1 is a front view showing the appearance of a digital camera.
Figure 2:
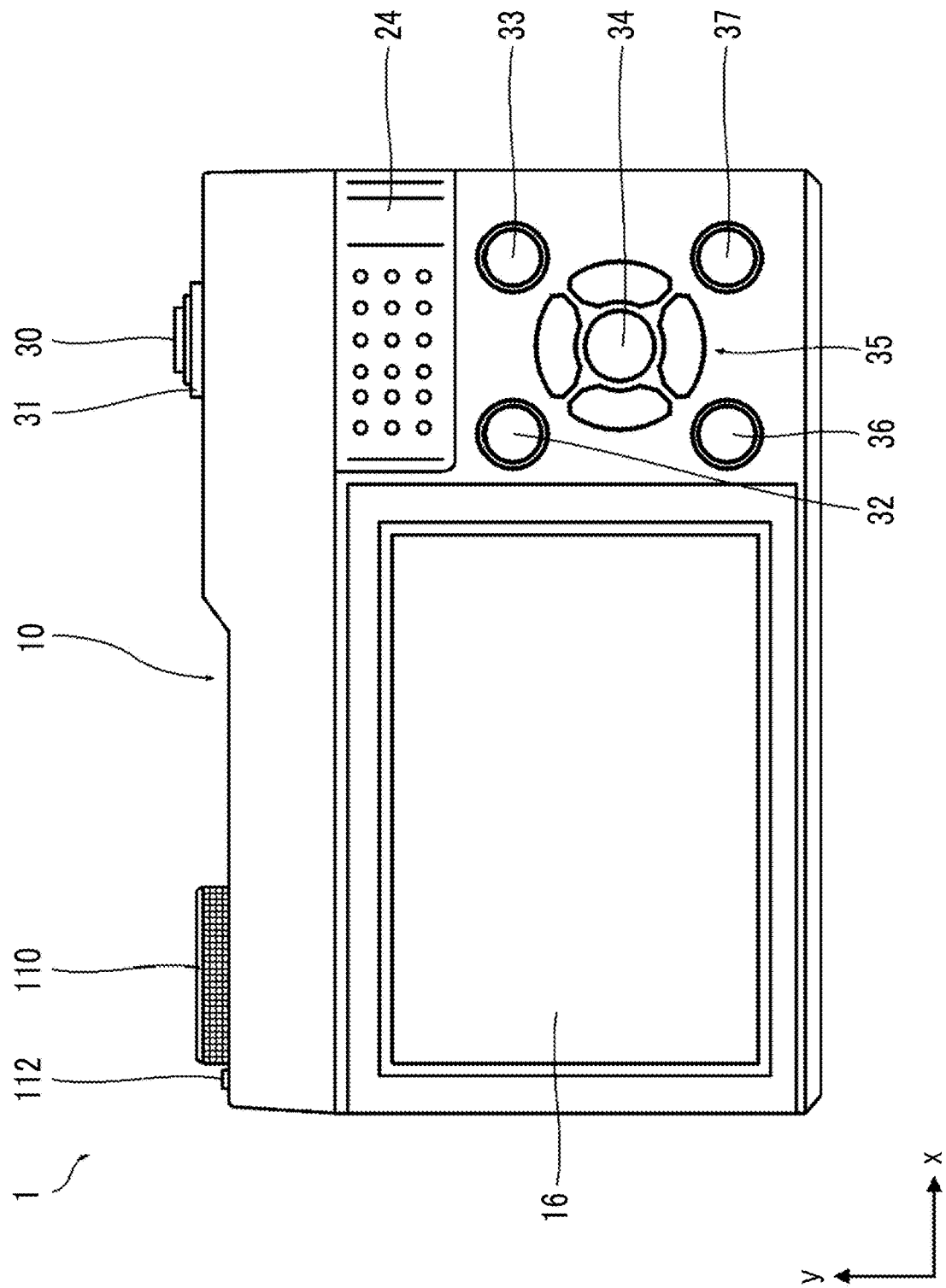
FIG. 2 is a back view showing the appearance of the digital camera.
Figure 3:
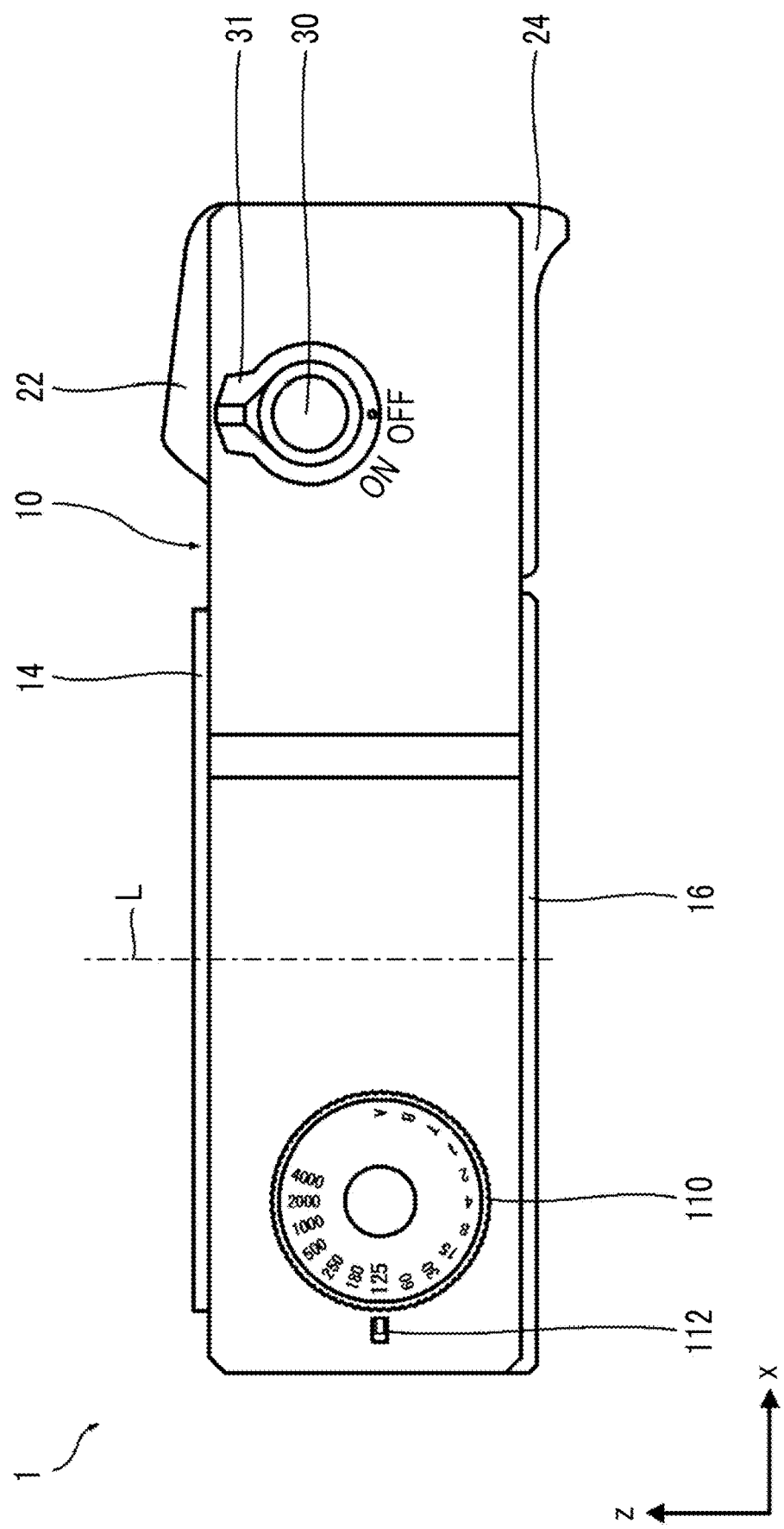
FIG. 3 is a plan view showing the appearance of the digital camera.

FIGS. 1, 2, and 3 are a front view, a back view, and a plan view showing the appearance of a digital camera, respectively.

In this specification, a direction along an optical axis L (a z direction in FIG. 3) is referred to as a front-rear direction and a subject side is referred to as a front direction. Further, on a plane orthogonal to the optical axis L, a direction along a long side of an image sensor 50 (an x direction in FIG. 1) is referred to as a lateral direction or a left-right direction and a direction along a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding incident light from a lens to an optical view finder, and is also referred to as a mirrorless digital camera.

Figure 4:
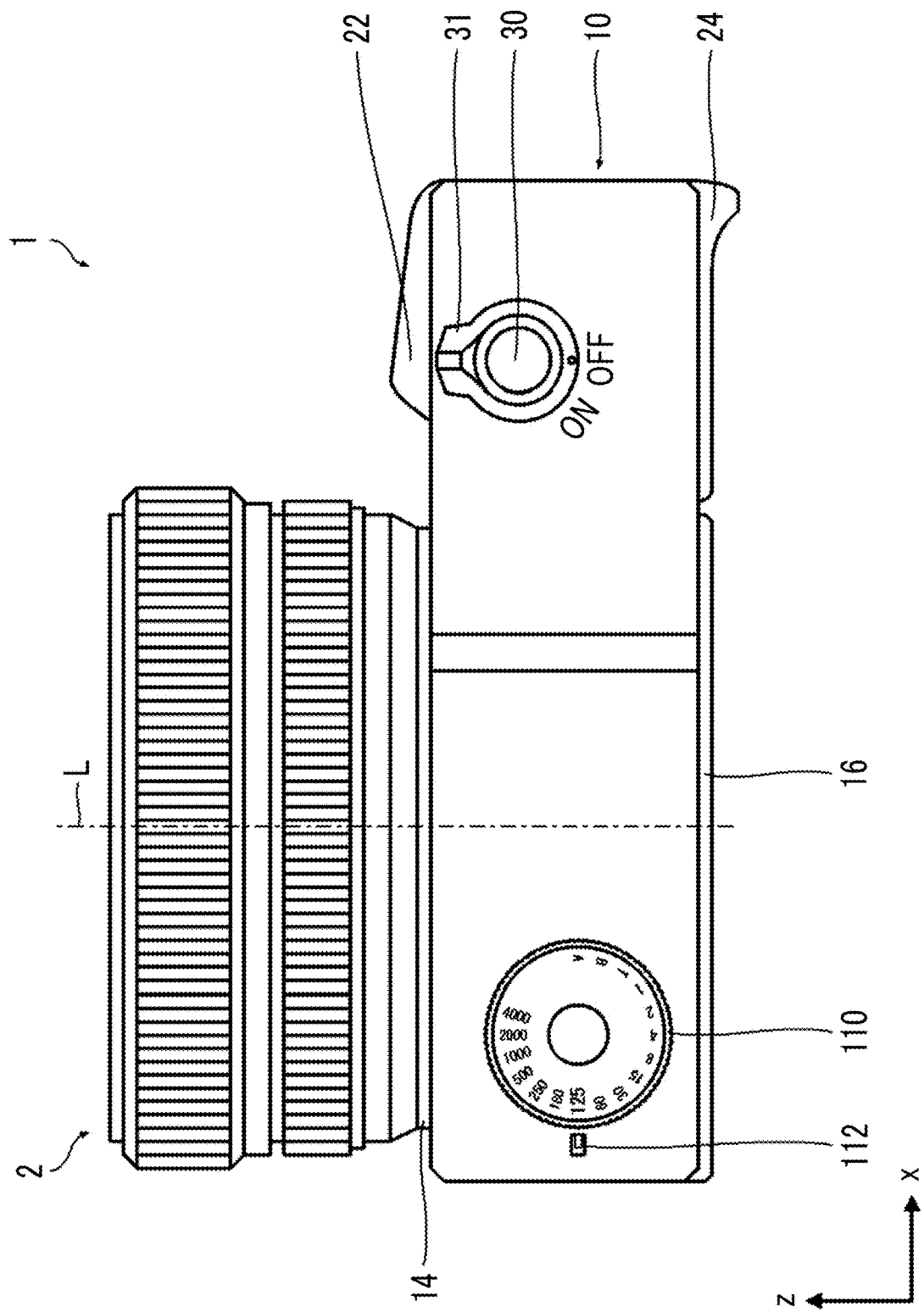
FIG. 4 is a plan view of the digital camera on which a lens is mounted.

FIG. 4 is a plan view of the digital camera on which a lens is mounted. As shown in FIG. 4, the digital camera 1 of this embodiment is used in a state in which a lens 2 is mounted on a camera body 10. The camera body 10 comprises a lens mount 14 for mounting the lens 2, a monitor 16 for displaying an image, various operation members for operating the digital camera 1, and the like.

<Camera Body>

The camera body 10 has the shape of a rectangular box that is thin in the front-rear direction. One (left side in FIG. 1) end portion of the camera body 10 is formed as a grip portion. A user grips the grip portion to perform a release operation. The grip portion comprises a grip 22 on the front surface side and a thumb rest 24 on the back surface side.

<Lens Mount>

The lens mount 14 is a mounting portion for the lens 2. As shown in FIG. 1, the lens mount 14 is provided on the front surface of the camera body 10. The lens 2 is mounted on the lens mount 14 attachably and detachably.

<Monitor>

As shown in FIG. 2, the monitor 16 is provided on the back surface of the camera body 10. The monitor 16 is formed of, for example, a color liquid crystal display (LCD). The monitor 16 is used to display an image and is also used as a graphical user interface (GUI). The image includes a live view image. The live view is to display an image captured by an image sensor on the monitor 16 in real time. The live view image is an image that is viewed lively. In a case where the digital camera 1 is set to an imaging mode, the live view image is displayed on the monitor 16. The user views the display on the monitor 16 to confirm the angle of view and a focus state and performs imaging.

<Operation Member>

The camera body 10 comprises a shutter button 30, a power supply lever 31, a playback button 32, an imaging setting button 33, a menu/OK button 34, selector buttons 35, a display/BACK button 36, a delete button 37, a shutter speed dial 110, and the like as the operation members for operating the digital camera 1.

The shutter button 30 is provided on an upper surface of the camera body 10 on a grip portion side. The shutter button 30 is formed of a so-called two-stage switch that has a half-pressed stage and a fully-pressed stage. In a case where the shutter button 30 is half pressed, an imaging preparation such as photometry and distance measurement is performed. In a case where the shutter button 30 is fully pressed, main imaging is performed.

The power supply lever 31 is disposed coaxially with the shutter button 30. The power supply lever 31 is formed of a rotary lever. In a case where the power supply lever 31 is rotated to an ON position, a power supply of the digital camera 1 is turned on. In a case where the power supply lever 31 is rotated to an OFF position, the power supply of the digital camera 1 is turned off.

The playback button 32 is a button that switches a mode of the digital camera 1 to a playback mode. The playback button 32 is provided on the back surface of the camera body 10. In a case where the playback button 32 is pressed in a state where the mode of the digital camera 1 is set to the imaging mode, the mode of the digital camera 1 is switched to the playback mode. In the case where the playback mode is set, the last captured image is displayed on the monitor 16.

A function of switching from the playback mode to the imaging mode is assigned to the shutter button 30. In a case where the shutter button 30 is pressed in a state where the playback mode is set, the mode of the digital camera 1 is switched to the imaging mode.

The imaging setting button 33 is a button that calls a setting screen of an imaging condition on the monitor 16. The imaging setting button 33 is provided on the back surface of the camera body 10. In a case where the imaging setting button 33 is pressed, a screen for setting various imaging conditions such as the imaging mode, a focus mode, sensitivity, an image size, an image quality mode, and a self-timer is displayed on the monitor 16. The user performs a desired setting by using the selector buttons 35 and the like according to the display on the monitor 16.

The menu/OK button 34 is a button that calls a menu screen on the monitor 16. The menu/OK button 34 is a button that instructs OK for a selection item, a confirmation item, or the like displayed on the monitor 16. The menu/OK button 34 is provided on the back surface of the camera body 10. In a case where the menu/OK button 34 is pressed in a state where the imaging mode or the playback mode is set, the menu screen is displayed on the monitor 16.

The selector buttons 35 is formed of four buttons of up, down, left, and right disposed on the same circle with the menu/OK button 34 as the center. A function according to a set state of the digital camera 1 is assigned to each button. For example, in the case where the digital camera 1 is set to the playback mode, in FIG. 2, a function of one-frame advance is assigned to the button in the right direction, and a function of one-frame return is assigned to the button in the left direction. A function of zoom-in is assigned to the button in the upper direction, and a function of zoom-out is assigned to the button in the lower direction. In the case where the digital camera 1 is set to the imaging mode, in FIG. 2, a function of calling the setting screen of white balance is assigned to the button in the right direction, and a function of calling the setting screen of the self-timer is assigned to the button in the left direction. A function of calling the setting screen of an auto focus (AF) mode is assigned to the button in the upper direction, and a function of calling the setting screen of a consecutive imaging mode is assigned to the button in the lower direction. Furthermore, in a case where the various setting screens are called on the monitor 16, the four buttons function as buttons that move a cursor in each direction on the screens.

The display/BACK button 36 is a button that instructs the switching of a display form of the monitor 16. The display/BACK button 36 is a button that performs an instruction to return the display on the monitor 16 to one previous state. The display/BACK button 36 is provided on the back surface of the camera body 10. In the state where the playback mode or the imaging mode is set, the display/BACK button 36 is pressed, the display form of the monitor 16 is switched. For example, in a case where the display/BACK button 36 is pressed in the state where the playback mode is set, an imaging condition, histogram, and the like of an image displayed on the monitor 16 are displayed on the image in an overlapped manner. For example, in a case where the display/BACK button 36 is pressed in the state where the imaging mode is set, various pieces of information such as the imaging condition or the histogram are displayed on the live view image in an overlapped manner. In a case where the display/BACK button 36 is pressed in a state where the various setting screens are displayed on the monitor 16, the display on the monitor 16 is returned to one previous state. Accordingly, it is possible to cancel the selection item, the confirmation item, or the like.

The delete button 37 is a button that performs an instruction to delete an imaged image displayed on the monitor 16. The delete button 37 is provided on the back surface of the camera body 10. In a case where the delete button 37 is pressed in the state where the imaged image is displayed on the monitor 16, a screen that confirms the deletion is displayed on the monitor 16. In a case where the instruction to delete is executed according to the display on the monitor 16, the imaged image during playback is deleted from a memory card.

The shutter speed dial 110 is an example of an operation dial and is used for setting a shutter speed. The shutter speed dial 110 is provided on the upper surface of the camera body 10. In the digital camera 1 of the embodiment, the shutter speed dial 110 is provided on an end portion opposite to the grip portion. The user rotationally operates the shutter speed dial 110 to set the shutter speed at the time of imaging. A configuration of the setting device of the shutter speed including the shutter speed dial 110 will be described below in detail.

«Control System»

Figure 5:
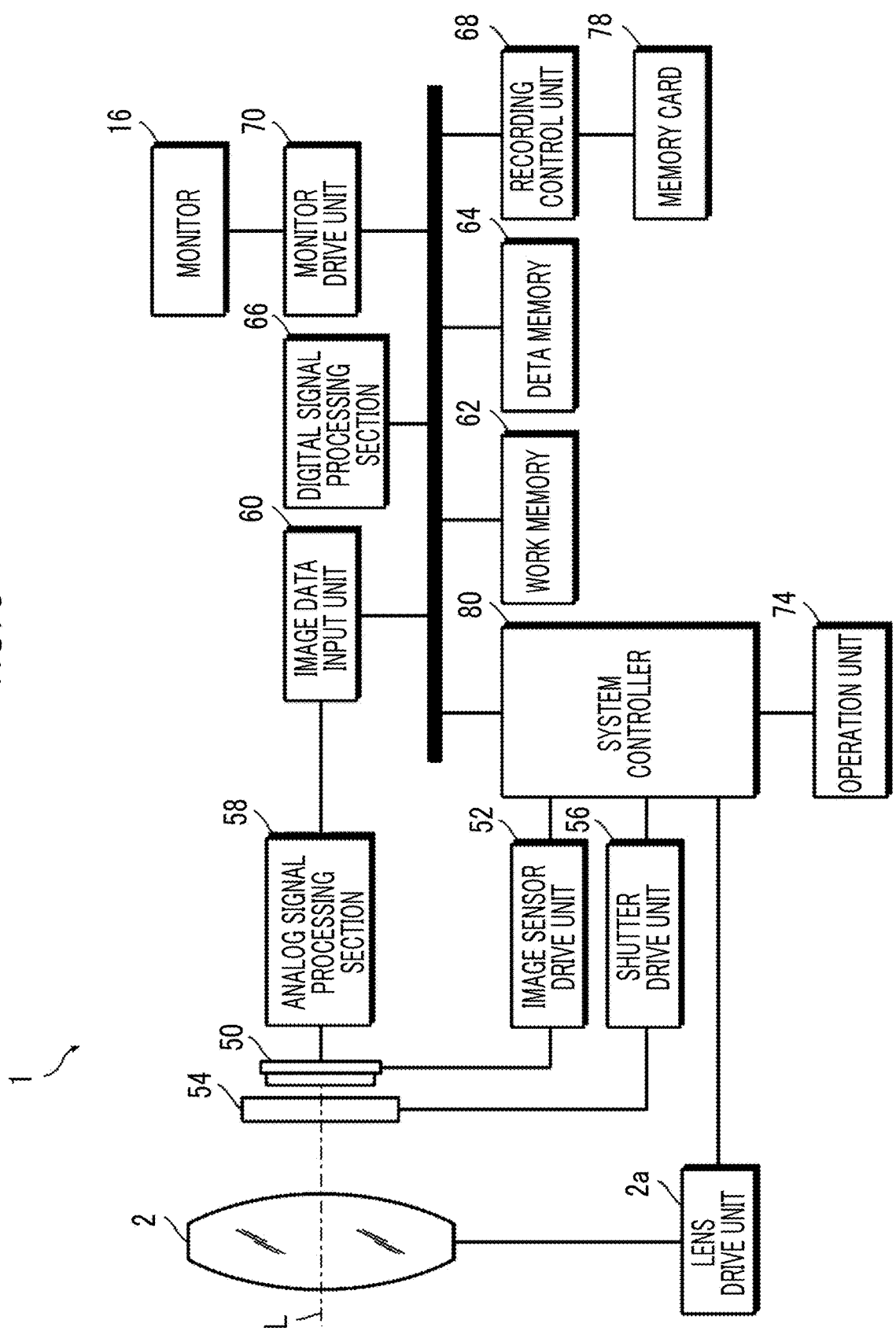
FIG. 5 is a block diagram showing the schematic configuration of a control system of the digital camera.

FIG. 5 is a block diagram showing the schematic configuration of a control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a monitor drive unit 70, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter and is disposed directly in front of the image sensor 50.

The shutter drive unit 56 drives the shutter 54 according to a command output from the system controller 80.

The analog signal processing section 58 receives the signals output from the image sensor 50 and performs required signal processing, such as correlative double sampling processing and amplification processing. Further, the analog signal processing section 58 converts analog image signals subjected to the required signal processing, into digital image signals and outputs the digital image signals.

The image data input unit 60 receives the digital image signals to be output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 accesses a memory card 78, and reads and writes data according to a command output from the system controller 80. Image data obtained by imaging is recorded in the memory card 78.

The monitor drive unit 70 drives the monitor 16 according to a command output from the system controller 80.

The operation unit 74 includes the shutter button 30, the power supply lever 31, the playback button 32, the imaging setting button 33, the menu/OK button 34, the selector buttons 35, the display/BACK button 36, the delete button 37, the shutter speed dial 110, and the like, and outputs the signal in response to the operation of each operation member to the system controller 80.

The system controller 80 is a control unit that controls the operation of each unit of the digital camera 1. The system controller 80 is formed of a microcomputer. That is, the microcomputer functions as the system controller 80 by executing a predetermined control program, and functions as a control unit that controls the operation of each unit of the digital camera 1.

The system controller 80 also functions as a control unit for the lens 2. The system controller 80 controls the operation of the lens 2 through a lens drive unit 2*a* provided in the lens 2. The lens 2 comprises a stop, a focus lens, and the like. The lens drive unit 2*a* comprises a stop drive unit that drives the stop, a focus lens drive unit that drives the focus lens, and the like.

«Shutter Speed Setting Device»

As described above, the digital camera 1 of the embodiment sets the shutter speed at the time of imaging with the shutter speed dial 110.

Figure 6:
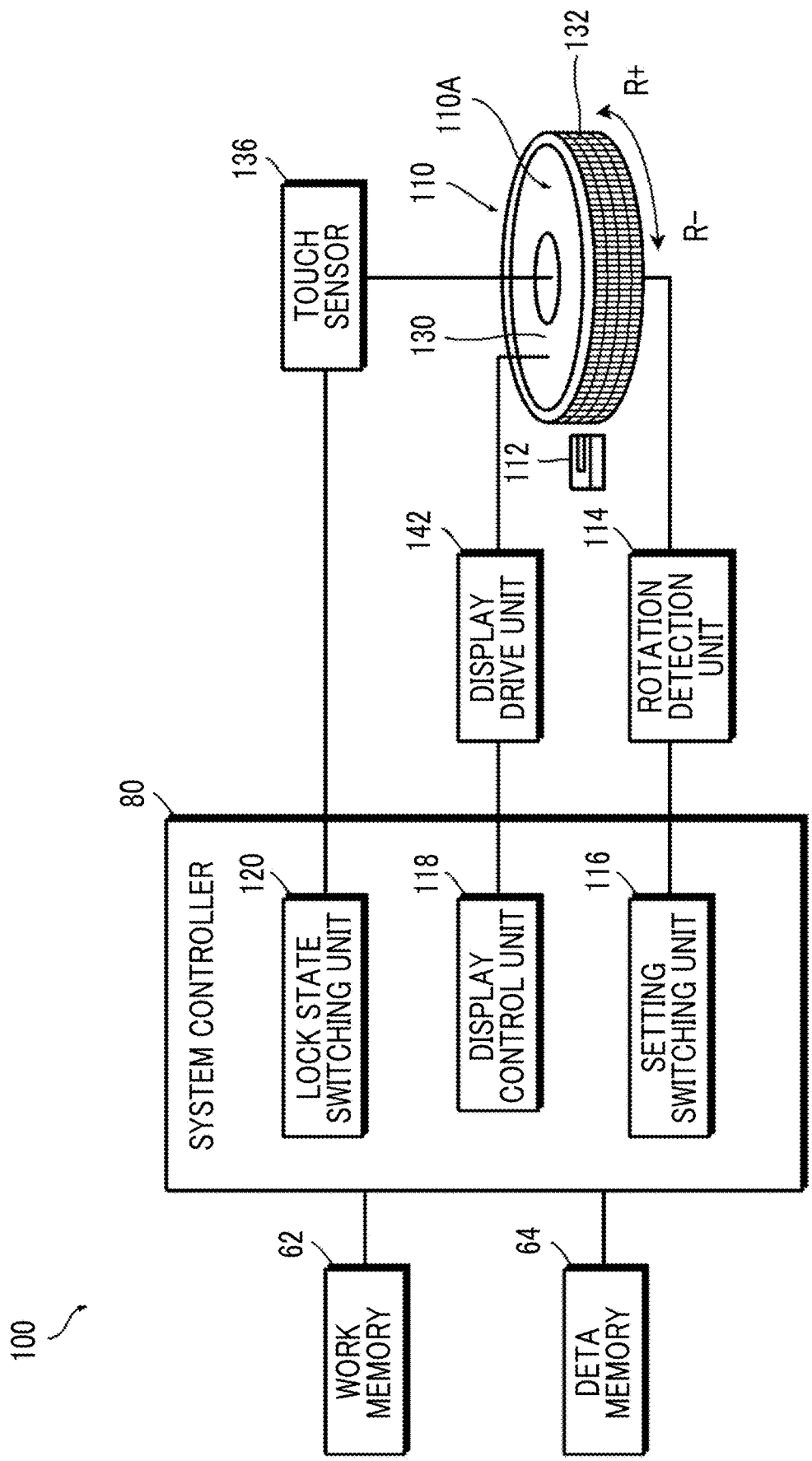
FIG. 6 is a block diagram showing the schematic configuration of a shutter speed setting device including a shutter speed dial.

FIG. 6 is a block diagram showing the schematic configuration of a shutter speed setting device including a shutter speed dial.

A shutter speed setting device 100 is an example of the setting device and sets the shutter speed. The shutter speed setting device 100 comprises the shutter speed dial 110 comprising a display section 110A on the upper surface (top surface) thereof, an indicator 112, a rotation detection unit 114 that detects the rotation of the shutter speed dial 110, a setting switching unit 116 that switches the shutter speed, a display control unit 118 that controls the display on the display section 110A, and a lock state switching unit 120 that locks and unlocks the switching of the shutter speed.

<Shutter Speed Dial>

Figure 7:
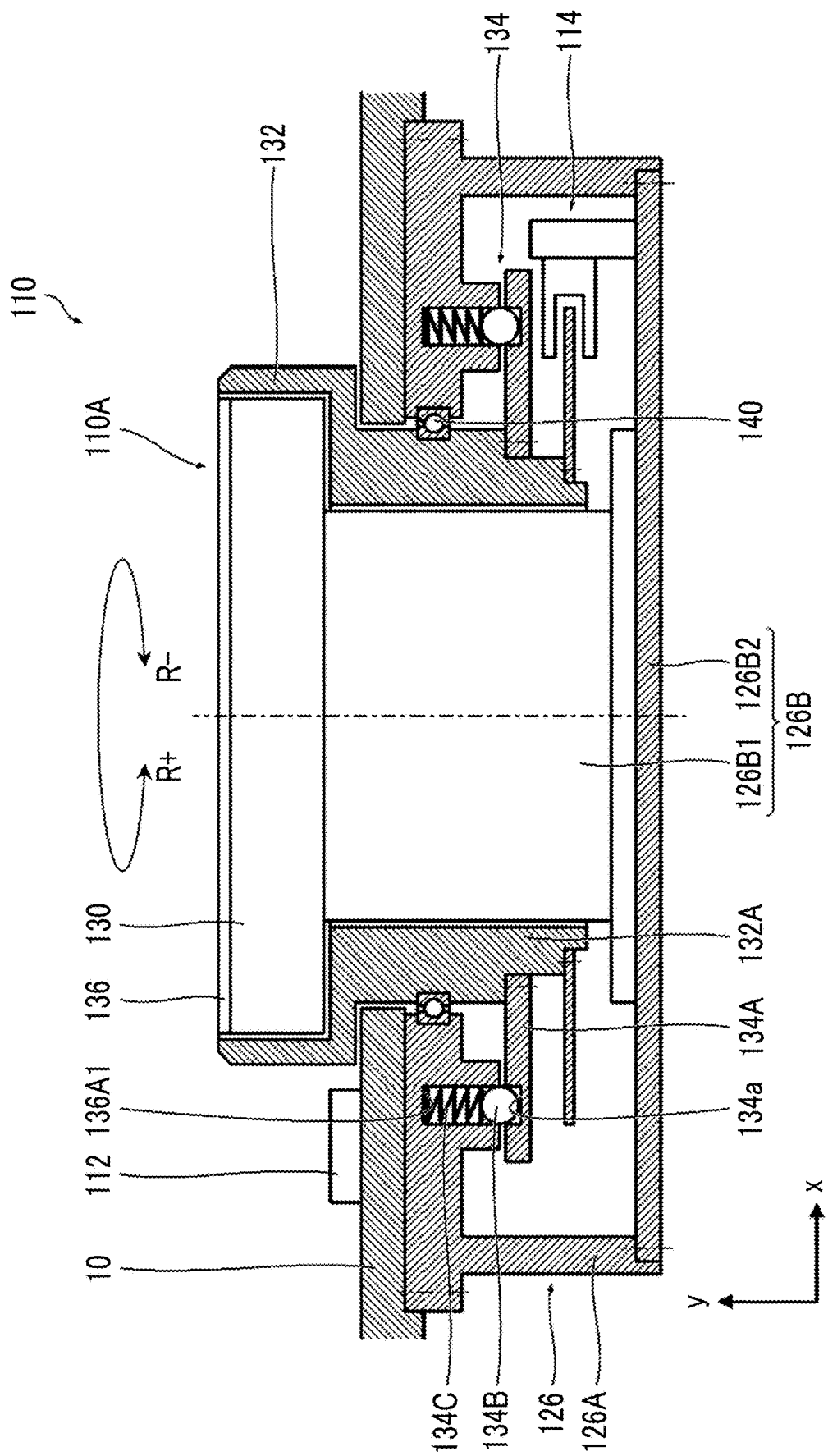
FIG. 7 is a longitudinal cross section view showing the schematic configuration of the shutter speed dial.

FIG. 7 is a longitudinal cross section view showing the schematic configuration of the shutter speed dial.

The shutter speed dial 110 comprises a disc-shaped display 130 forming a dial plate, an endlessly rotatable operation ring 132, and a click mechanism 134 that generates a click feeling in the rotation operation of the operation ring 132.

[Display]

The display 130 forms the dial plate of the shutter speed dial 110. The display 130 has a display surface on the upper surface, and the display surface forms the upper surface of the shutter speed dial 110. That is, the display surface of the display 130 forms the display section 110A of the shutter speed dial 110. The display 130 is formed of, for example, the LCD.

The display 130 is fixedly mounted on a shutter speed dial support frame 126 that supports the shutter speed dial 110.

The shutter speed dial support frame 126 has a support frame main body 126A and a display support frame 126B. The support frame main body 126A is fixedly mounted on the camera body 10.

The display support frame 126B has a base part 126B2 and a support part 126B1. The base part 126B2 has a plate shape and is fixedly mounted on the support frame main body 126A. The support part 126B1 has a columnar shape and is fixedly mounted on the base part 126B2. The display 130 is fixedly mounted on the top portion of the support part 126B1.

A touch sensor 136 that detects contact is provided on the display surface (upper surface) of the display 130. The touch sensor 136 is an example of the contact detection unit and detects the contact of a finger to the display surface of the display 130. As described above, since the display surface of the display 130 forms the upper surface of the shutter speed dial 110, the touch sensor 136 detects the contact with the upper surface of the shutter speed dial 110. A detection region of the touch sensor 136 is the entire surface of the display surface of the display 130.

[Operation Ring]

The operation ring 132 forms a rotation operation unit of the shutter speed dial 110. The operation ring 132 is provided so as to be endlessly rotatable the outer periphery of the display 130 in normal and reverse directions. The operation ring 132 has a cylindrical shaft portion 132A on the coaxially lower portion thereof. In the operation ring 132, the shaft portion 132A is supported by bearings 140 provided on the support frame main body 126A and is supported so as to be endlessly rotatable in normal and reverse directions. In this specification, in FIG. 7, a rotation direction (counterclockwise rotation direction) indicated by an arrow of a reference numeral R+ is referred to as a plus direction, and a rotation direction (clockwise rotation direction) indicated by an arrow of a reference numeral R− is referred to as a minus direction. The plus rotation direction R+ and the minus rotation direction R− are opposite to each other.

[Click Mechanism]

The click mechanism 134 generates the click feeling in the rotation operation of the operation ring 132. The click mechanism 134 comprises a click groove-metal plate 134A, click balls 134B, and click springs 134C.

The click groove-metal plate 134A has the shape of a disc that comprises a circular hole at the center thereof. The click groove-metal plate 134A is fixed to the shaft portion 132A of the operation ring 132 by passing the shaft portion 132A of the operation ring 132 through the center hole thereof. The click groove-metal plate 134A is disposed coaxially with the operation ring 132 and rotates together with the operation ring 132.

The click groove-metal plate 134A comprises a plurality of click grooves 134*a* that are formed on the same circumference at regular intervals. The click grooves 134*a* are provided on the upper surface of the click groove-metal plate 134A as spherical depressions. The disposition interval of the click grooves 134*a* is an interval that generates the click feeling.

The click balls 134B are members that are fitted to the click grooves 134*a* and generate the click feelings. The click balls 134B are provided on the support frame main body 126A of the shutter speed dial support frame 126. The support frame main body 126A comprises click ball-receiving holes 126A1 that receive the click balls 134B. The click ball-receiving holes 126A1 are provided parallel to the rotation axis of the operation ring 132 as bottom holes. Further, the click ball-receiving holes 126A1 are provided at positions facing the click grooves 134*a*.

The click springs 134C are members that bias the click balls 134B to the click groove-metal plate 134A. The click springs 134C are received in the click ball-receiving holes 126A1.

The action of the click mechanism 134 having the above-mentioned configuration is as follows. In a case where the operation ring 132 is rotated, the click groove-metal plate 134A is rotated. In a case where the click groove-metal plate 134A is rotated, the click balls 134B are fitted to the click grooves 134*a* at regular angular intervals. Accordingly, the click feelings are generated at regular angular intervals. Further, in a case where the rotation of the click groove-metal plate 134A is stopped at the time of generation of the click feeling, the click balls 134B are fitted to the click grooves 134*a*. Accordingly, the rotation of the click groove-metal plate 134A is stopped. That is, as long as the click groove-metal plate 134A is not rotated with a load equal to or larger than a certain level, a stop state of the click groove-metal plate 134A is maintained. The state where the click balls 134B are fitted to the click grooves 134a and the rotation of the click groove-metal plate 134A is stopped is referred to as click-stop.

In a case where a click-stop position is referred to as a click position, the number of click positions is the same as the number of click grooves 134a. The intervals of the click positions are also the same as the intervals of the click grooves 134a. In a case where the number of click positions per rotation is 10, the disposition interval of the click grooves 134a becomes 36°. In this case, in a case where the operation ring 132 is rotated, the click feelings are generated at 36° intervals. Further, it is possible to perform the click-stop at 36° interval.

<Rotation Detection Unit>

The rotation detection unit 114 detects the rotation direction and a rotation amount of the shutter speed dial 110. The rotation detection unit 114 is formed of a rotary encoder and detects the rotation of the shaft portion 132A of the operation ring 132 to detect the rotation direction and the rotation amount of the shutter speed dial 110. Accordingly, it is possible to detect an operation direction and an operation amount of the rotation of the shutter speed dial 110. For example, in the case where the number of click positions per rotation is 10, it is possible to detect that the shutter speed dial 110 is rotationally operated by one click in the plus direction R+ by detecting rotation by 36° in the plus direction R+. A detection result of the rotation detection unit 114 is output to the system controller 80.

<Indicator>

The indicator 112 is provided on the camera body 10. The indicator 112 has the shape of a bar and is disposed so as to indicate one point on the outer periphery of the shutter speed dial 110. In the digital camera 1 of this embodiment, as shown in FIG. 3, the indicator 112 is disposed on the shutter speed dial 110 at a position corresponding to nine o'clock.

A user rotationally operates the shutter speed dial 110 with the indicator 112 as the reference. That is, a user rotationally operates the shutter speed dial 110 such that the display of the shutter speed to be set is positioned at the position of the indicator 112.

<Setting Switching Unit>

The setting switching unit 116 switches the setting of the shutter speed according to the rotation of the shutter speed dial 110 to be detected by the rotation detection unit 114. That is, every time the rotation of one click is detected, the setting of the shutter speed is advanced or lowered one by one. In a case where the shutter speed dial 110 is rotated in the plus direction R+, the shutter speed is advanced. In a case where the shutter speed dial 110 is rotated in the minus direction R−, the shutter speed is lowered.

As described below, in a case where the switching of the shutter speed by the lock state switching unit 120 is locked, the setting switching unit 116 is prohibited from switching the shutter speed. That is, even in a case where the shutter speed dial 110 is rotationally operated, the shutter speed is not switched, and a current setting is maintained.

FIG. 8 is a list of shutter speeds that can be set by the digital camera of the embodiment and notations of the shutter speeds on a display section.

As shown in FIG. 8, in the digital camera 1 of the embodiment, the setting of the shutter speed can be set by selecting any of Auto, Bulb, Time, 1 second, ½ second, ¼ second, ⅛ second, $\frac{1}{15}$ second, $\frac{1}{30}$ second, $\frac{1}{60}$ second, $\frac{1}{125}$ second, $\frac{1}{180}$ second, $\frac{1}{250}$ second, $\frac{1}{500}$ second, $\frac{1}{1000}$ second, $\frac{1}{2000}$ second, or $\frac{1}{4000}$ second.

Here, the "Auto" is a mode in which the camera automatically decides the shutter speed at which a proper exposure is achieved. The "Bulb" is a mode in which a shutter is opened while the shutter button 30 is pressed and the shutter is closed while the shutter button 30 is released. The "Time" is a mode in which the user designates an exposure time, and is mainly used for a long-time exposure. The designation of the exposure time is separately performed.

The shutter speed is sequentially switched in order of Auto, Bulb, Time, 1 second, ½ second, ¼ second, ⅛ second, $\frac{1}{15}$ second, $\frac{1}{30}$ second, $\frac{1}{60}$ second, $\frac{1}{125}$ second, $\frac{1}{180}$ second, $\frac{1}{250}$ second, $\frac{1}{500}$ second, $\frac{1}{1000}$ second, $\frac{1}{2000}$ second, or $\frac{1}{4000}$ second. The shutter speed after $\frac{1}{4000}$ second is auto. That is, the shutter speed loops in the above order.

Data of settable shutter speeds, that is, data of the table shown in FIG. 8 is stored in the data memory 64. The setting switching unit 116 reads the data of the settable shutter speeds from the data memory 64 and switches the setting of the shutter speed according to the rotation of the shutter speed dial 110 detected by the rotation detection unit 114.

The setting switching unit 116 is provided as one function of the system controller 80. That is, the system controller 80 executes the predetermined control program to function as the setting switching unit 116.

<Display Control Unit>

The display control unit 118 controls the display on the display section 110A of the shutter speed dial 110. The display control unit 118 controls the display on the display section 110A of the shutter speed dial 110 according to the switching of the shutter speed by the setting switching unit 116 to display an image of the dial plate on the upper surface (top surface) of the shutter speed dial 110.

The display control unit 118 is provided as one function of the system controller 80. That is, the system controller 80 executes the predetermined control program to function as the display control unit 118. As shown in FIG. 6, the display control unit 118 controls the driving of the display 130 through a display drive unit 142 to control the display on the display section 110A of the shutter speed dial 110.

[Display of Display Section]

Figure 9:
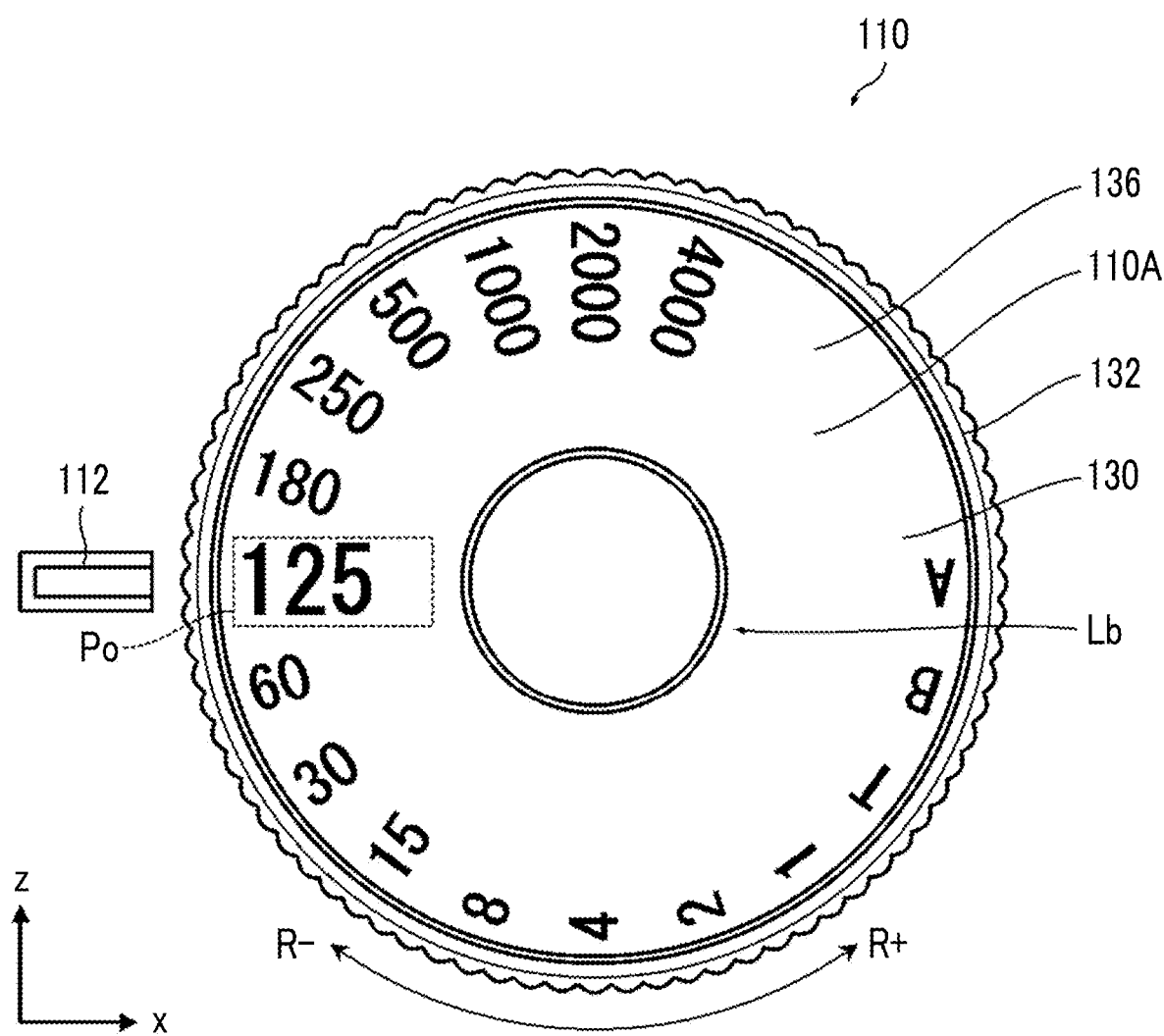
FIG. 9 is a top view of the shutter speed dial.

FIG. 9 is a top view of the shutter speed dial 110. FIG. 9 shows an example of the dial plate image displayed on the display section 110A of the shutter speed dial 110.

As shown in FIG. 9, the display section 110A displays an image picture Lb of a lock button and the shutter speeds.

The lock button is a button that locks and unlocks the switching of the shutter speed. In a case where the switching of the shutter speed is locked, the switching of the shutter speed by the shutter speed dial 110 becomes impossible. That is, even in a case where the shutter speed dial 110 is rotationally operated, the shutter speed cannot be switched.

The switching between a locked state and an unlocked state is performed by a toggle type. That is, every time the lock button is pressed, the locked state and the unlocked state are alternately switched.

Since the lock button is the image picture Lb displayed on the display section 110A, it is impossible to actually press the lock button. Actual detection of a touch is performed by the touch sensor 136 provided on the display 130. That is, the touch on the upper surface of the shutter speed dial 110 is detected by the touch sensor 136 to detect that the lock button is pressed.

Further, in a case where the touch sensor 136 detects that the lock button is pressed, the display form of the image picture Lb of the lock button is switched. Accordingly, it is possible to confirm that the lock button is pressed and the locked state and the unlocked state are switched. In the embodiment, the display form is switched by inverting a display color of the image picture Lb of the lock button. This point will be described below in detail.

The image picture Lb of the lock button is displayed in the center of the display section 110A. The image picture Lb of the lock button is an image imitating an actual button. In the example shown in FIG. 9, an image imitating a circular button is displayed on the display section 110A as the image picture Lb of the lock button.

The shutter speed is displayed on the same circumference at regular intervals with a rotation center of the shutter speed dial 110 as the center. Display intervals are the same as setting intervals of the click positions. Therefore, for example, in a case where the setting interval of the click position is 36°, the shutter speed is displayed at 36° interval.

The shutter speed displayed on the display section 110A is displayed as a reciprocal number. That is, as shown in FIG. 8, 1 second, ½ second, ¼ second, ⅛ second, 1/15 second, 1/30 second, 1/60 second, 1/125 second, 1/180 second, 1/250 second, 1/500 second, 1/1000 second, 1/2000 second, and 1/4000 second are respectively displayed as 1, 2, 4, 8, 15, 30, 60, 125, 180, 250, 500, 1000, 2000, and 4000. Further, each mode of Auto, Bulb, and Time is simply displayed with initials as A, B, and T, respectively.

The sequence of the display of the shutter speed is the order of the switching. That is, the shutter speed is displayed in order of A, B, T, 1, 2, 4, 8, 15, 30, 60, 125, 180, 250, 500, 1000, 2000, and 4000.

Further, a direction in which the shutter speed is displayed is the clockwise direction (minus direction R−). That is, the shutter speed is displayed in order of A, B, T, 1, 2, 4, 8, 15, 30, 60, 125, 180, 250, 500, 1000, 2000, and 4000 along the clockwise direction (minus direction R−).

A display position is set such that a currently selected shutter speed is displayed at a current setting display position Po. The current setting display position Po is set at a position corresponding to the indicator 112. In the digital camera 1 of the embodiment, since the indicator 112 is positioned at the position corresponding to nine o'clock, the current setting display position Po is set at the position corresponding to nine o'clock. Accordingly, it is possible to easily grasp the selectable settings and thus to further improve the operability.

In FIG. 9, the current setting display position Po is indicated by a broken line. However, the broken line is indicated for convenience of the description and is not actually displayed on the display section 110A.

In the example shown in FIG. 9, a case where the currently selected shutter speed is 1/125 second is displayed. In this case, as shown in FIG. 9, "125" indicating 1/125 second is displayed at the current setting display position Po.

A shutter speed displayed at the current setting display position Po is displayed relatively larger than other shutter speeds. That is, the currently selected shutter speed is displayed relatively larger character size than other shutter speeds. Accordingly, it is possible to clarify a value of the currently selected shutter speed. Accordingly, it is possible to visually recognize the currently selected setting easily and thus to further improve the operability.

The display on the display section 110A is switched in conjunction with the switching of the shutter speed. That is, the display on the display section 110A is switched in conjunction with the rotation operation of the shutter speed dial 110.

Figure 10B:
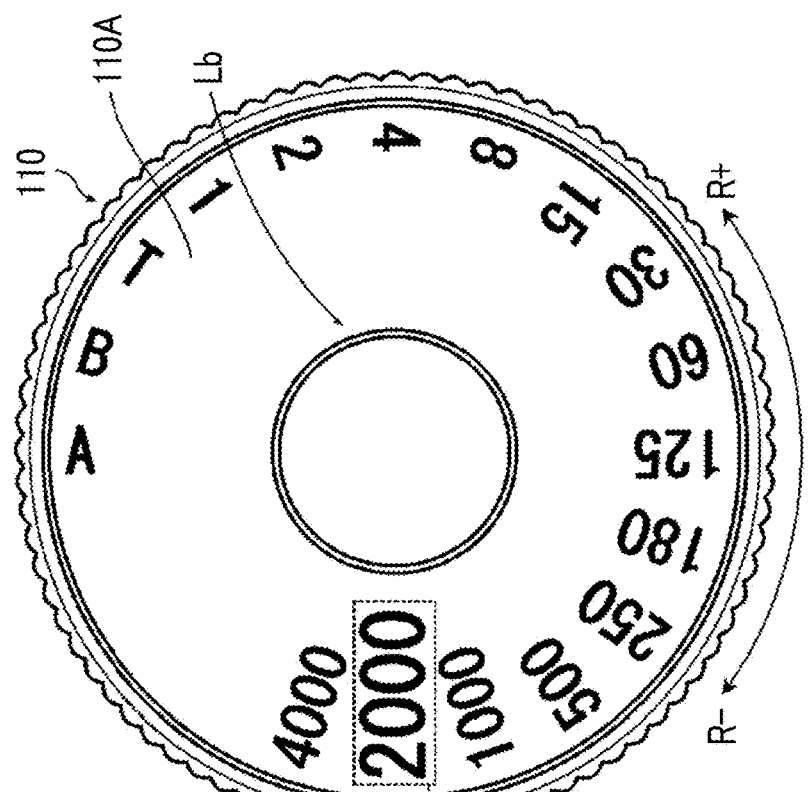
FIGS. 10A and 10B are transition diagrams of displays on a display section of the shutter speed dial in response to a rotation operation.
Figure 10A:
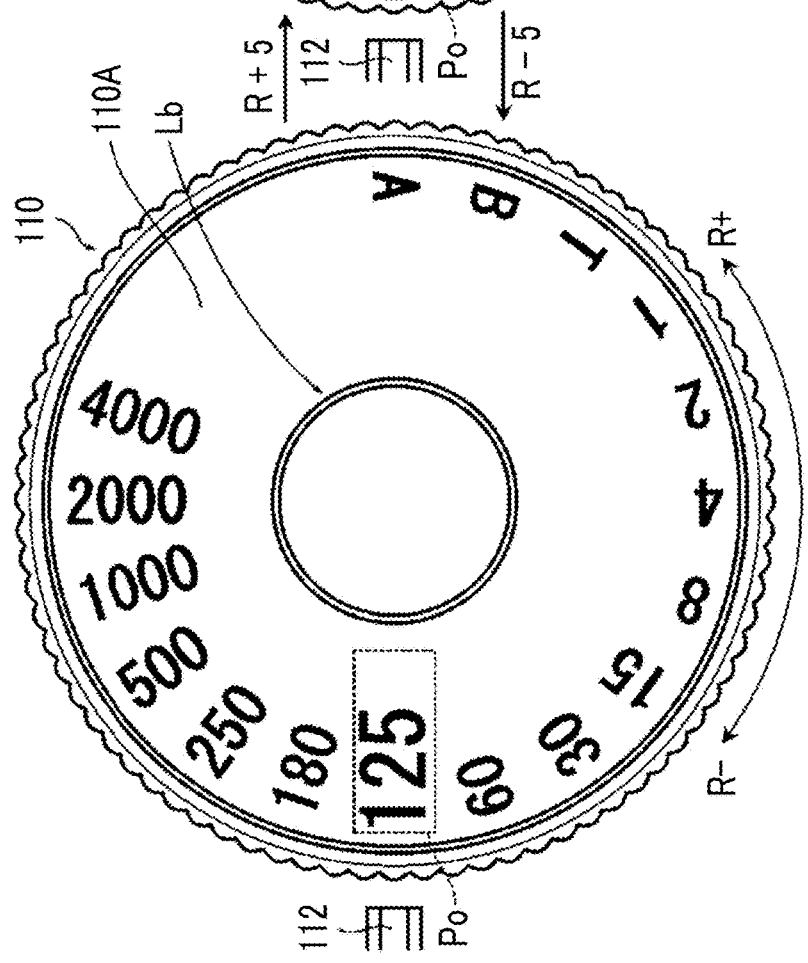

FIGS. 10A and 10B are transition diagrams of displays on the display section in response to the rotation operation of the shutter speed dial.

FIG. 10B shows a display state of the display section 110A in a case where the shutter speed dial is rotated by five clicks in the plus direction R+ from a state shown in FIG. 10A. Further, FIG. 10A shows a display state of the display section 110A in a case where the shutter speed dial is rotated by five clicks in the minus direction R− from the state shown in FIG. 10B.

It is assumed that the shutter speed is set to 1/125 second. In this case, as shown in FIG. 10A, "125" indicating 1/125 second is displayed at the current setting display position Po.

In a case where the shutter speed dial 110 is rotated by five clicks in the plus direction R+ from the state where the shutter speed is set to 1/125 second, the shutter speed is advanced by five stages and is set to 1/2000 second (refer to FIG. 8). As a result, as shown in FIG. 10B, "2000" indicating 1/2000 second is displayed at the current setting display position Po.

Further, in a case where the shutter speed dial 110 is rotated by five clicks in the minus direction R− from the state where the shutter speed is set to 1/2000 second, the shutter speed is lowered by five stages and is set to 1/125 second (refer to FIG. 8). As a result, as shown in FIG. 10A, "125" is displayed at the current setting display position Po.

In this manner, the display on the display section 110A is switched according to the rotation amount and the rotation direction of the shutter speed dial 110.

At the time of the switching, the display control unit 118 rotates the dial plate image to switch the display. That is, as in the case of operating the shutter speed dial of which the shutter speeds are printed on the dial plate, the display is switched by rotating the dial plate image. For example, in the case where the shutter speed is switched from 1/125 second to 1/2000 second by rotating the shutter speed dial 110 in the plus direction R+(counterclockwise direction) (case of switching from the state shown in FIG. 10A to the state shown in FIG. 10B), the display is switched while the dial plate image is rotated in the plus direction R+ with the rotation center of the shutter speed dial 110 as the center. Further, for example, in the case where the shutter speed is switched from 1/2000 second to 1/125 second by rotating the shutter speed dial 110 in the minus direction R− (clockwise direction) (case of switching from the state shown in FIG. 10B to the state shown in FIG. 10A), the display is switched while the dial plate image is rotated in the minus direction R− with the rotation center of the shutter speed dial 110 as the center. That is, the display is switched as the display 130 also rotates in conjunction with the rotation of the operation ring 132. Accordingly, it is possible to operate the shutter speed dial 110 with the same operation feeling as the operation feeling of the former shutter speed dial of which the shutter speeds are printed on the dial plate.

In a case where the switching of the shutter speed is locked, since the switching of the shutter speed cannot be performed, the display on the display section 110A is not switched even in a case where the shutter speed dial 110 is rotationally operated. This point will be described below in detail.

<Lock State Switching Unit>

The lock state switching unit 120 locks and unlocks the switching of the shutter speed based on a detection result of the touch sensor 136. That is, processing of switching the locked state and the unlocked state is performed. The locked state is a state of locking the switching of the shutter speed and is a state where the switching of the shutter speed is impossible. Therefore, in the locked state, even in the case where the shutter speed dial 110 is rotationally operated, the setting is not switched. On the other hand, the unlocked state is a state of releasing the switching of the shutter speed and is a state where an operation is valid. In the unlocked state, the shutter speed can be switched in response to the rotation operation of the shutter speed dial 110.

The switching between the locked state and the unlocked state is performed by the toggle type. That is, every time the contact with the upper surface of the shutter speed dial 110 is detected by the touch sensor 136, the locked state and the unlocked state are alternately switched.

In a case where the locked state is set, the switching of the shutter speed is prohibited. That is, even in the case where the shutter speed dial 110 is rotationally operated, the shutter speed cannot be switched.

The setting switching unit 116 performs processing of switching the setting of the shutter speed according to the setting of the locking or the unlocking by the lock state switching unit 120.

The lock state switching unit 120 is provided as one function of the system controller 80. That is, the system controller 80 executes the predetermined control program to function as the lock state switching unit 120.

《Action of Shutter Speed Setting Device》
<Setting Processing of Shutter Speed>

The shutter speed setting device 100 sets the shutter speed in response to the rotation operation of the shutter speed dial 110.

Figure 11:
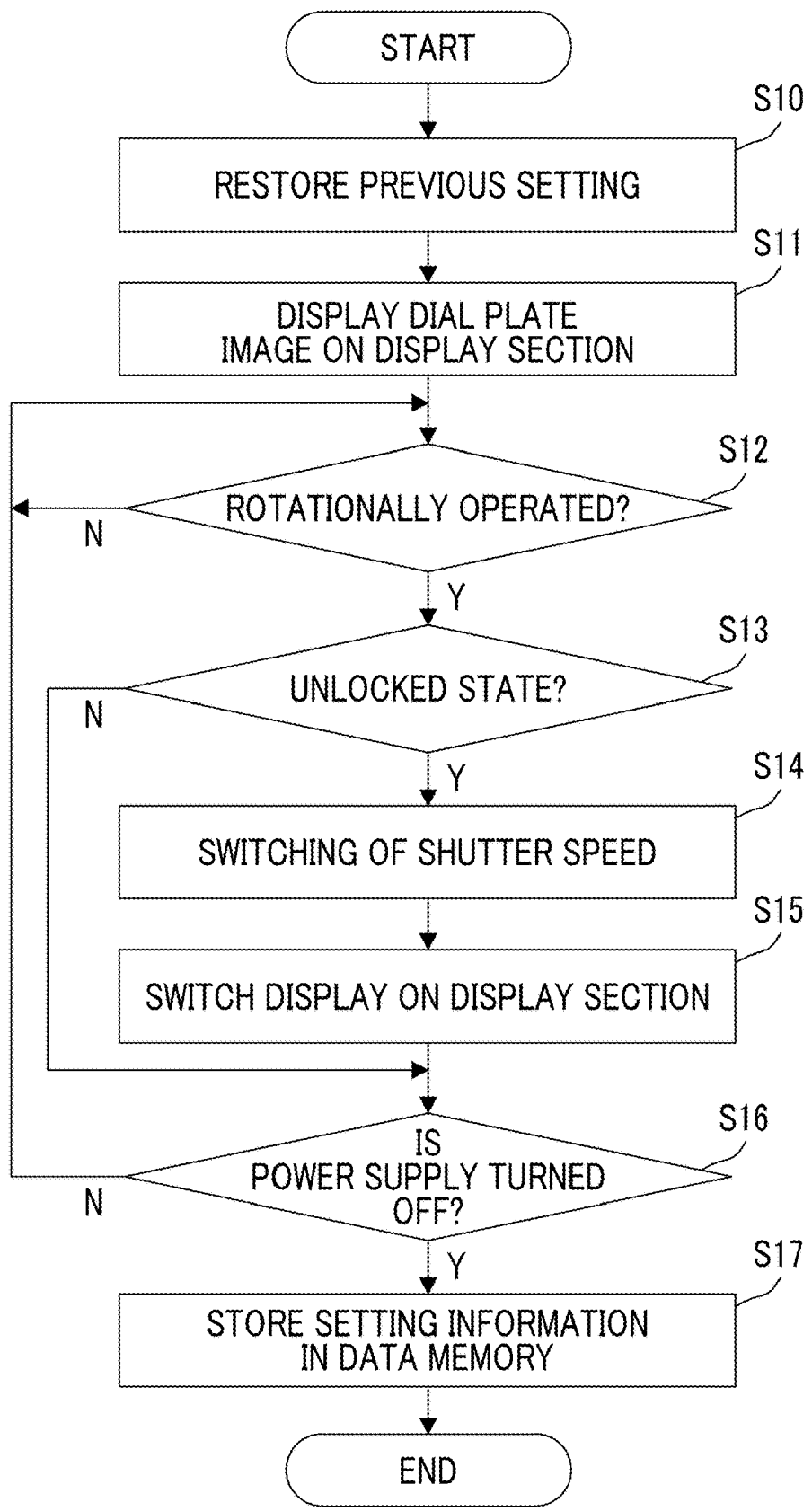
FIG. 11 is a flowchart showing a procedure of setting processing of the shutter speed by the shutter speed setting device.

FIG. 11 is a flowchart showing a procedure of setting processing of the shutter speed by the shutter speed setting device.

In a case where the power supply of the digital camera 1 is turned on, a previous setting is restored (step S10). That is, a shutter speed set at the time of power supply off is set. Further, in a case where the switching of the shutter speed is locked at the time of power supply off, the locked state is set. Setting information at the time of power supply off is read from the data memory 64.

Next, the dial plate image is displayed on the display section 110A of the shutter speed dial 110 based on information on the set shutter speed (step S11).

Then, the presence or absence of the operation of the shutter speed dial 110 is determined (step S12). In a case where the shutter speed dial 110 is rotationally operated, it is determined whether the switching of the shutter speed is in the unlocked state (step S13).

In the case of the unlocked state, the shutter speed is switched according to the operated rotation direction and rotation amount (the number of clicks) (step S14). The display on the display section 110A is switched in conjunction with the switching of the setting (step S15).

On the other hand, in the case of the unlocked state, that is, in the case of the locked state, even in the case where the rotation operation is performed, the setting switching unit 116 does not accept the switching. In this case, the setting of the shutter speed is not changed, and the display on the display section 110A is also not changed.

In a case where the shutter speed is switched, a lock of the switching of the shutter speed is released. In order to release the lock, the lock button is pressed once. That is, the upper surface of the shutter speed dial 110 is touched once. Accordingly, the lock of the switching of the shutter speed is released, and the unlocked state is set.

In this manner, the switching of the shutter speed is valid only in a case where the unlocked state is set. In a case where the locked state is set, even in the case where the shutter speed dial 110 is rotationally operated, the operation is invalid and the setting is maintained as a state before the operation.

Then, it is determined whether the power supply is turned off (step S16). In a case where the power supply is turned off, a current setting is stored in the data memory 64 (step S17), and the processing ends.

<Switching Processing Between Locked State and Unlocked State>

The switching between the locked state and the unlocked state is performed by touching the upper surface of the shutter speed dial 110. The switching is performed by the toggle type.

Figure 12:
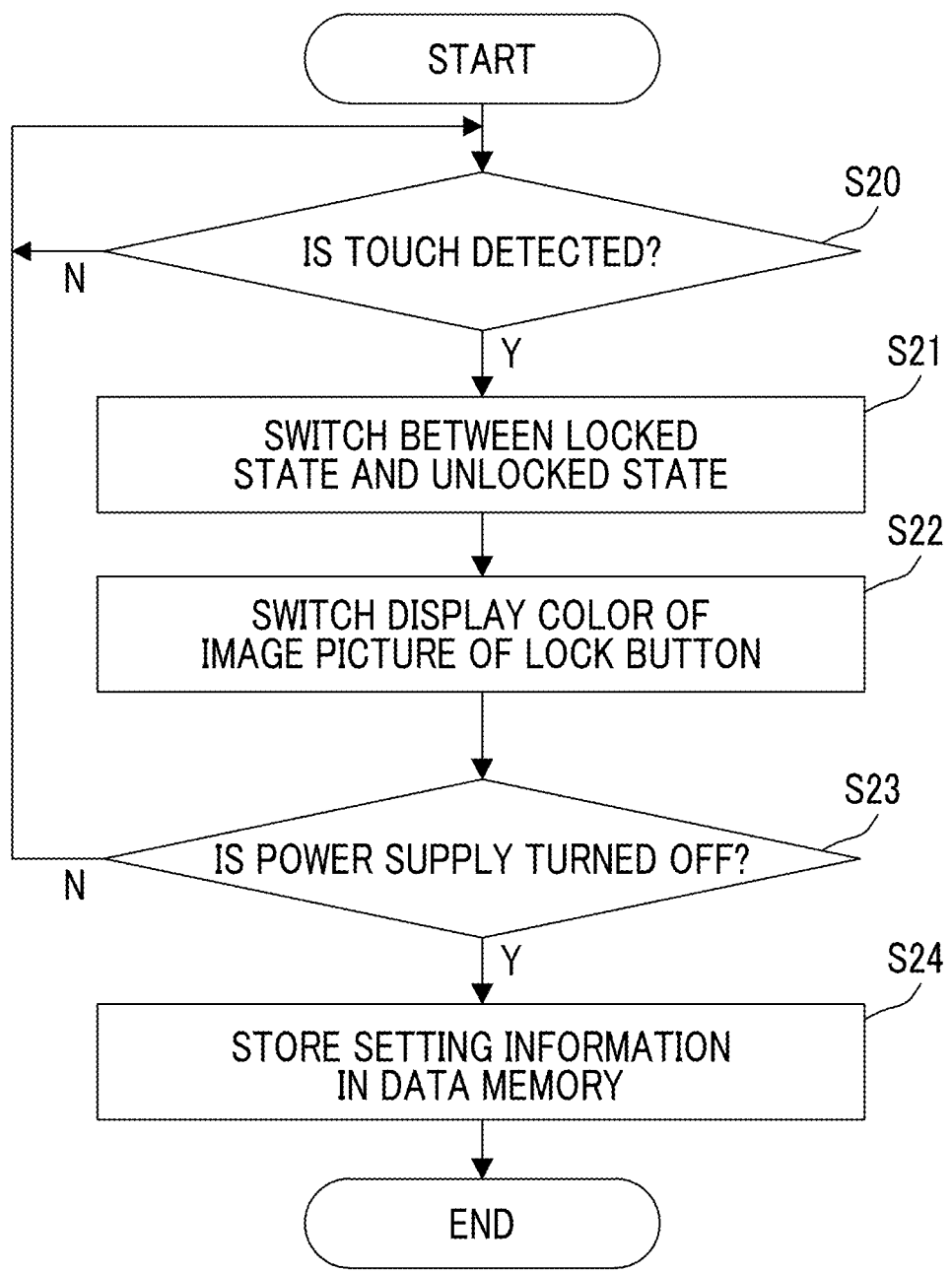
FIG. 12 is a flowchart showing a processing procedure of switching between a locked state and an unlocked state.

FIG. 12 is a flowchart showing a processing procedure of the switching between the locked state and the unlocked state.

The presence or absence of the touch on the upper surface of the shutter speed dial 110 is determined (step S20).

In a case where the touch on the upper surface of the shutter speed dial 110 is detected, the locked state and the unlocked state are switched (step S21). That is, in the case where the locked state is set, the state is switched to the unlocked state. In the case where the unlocked state is set, the state is switched to the locked state.

In the case where the state is switched to the locked state, the switching of the shutter speed by the shutter speed dial 110 becomes invalid. Accordingly, even in the case where the shutter speed dial 110 is rotationally operated, it is impossible to switch the shutter speed.

On the other hand, in the case where the state is switched to the unlocked state, the switching of the shutter speed by the shutter speed dial 110 becomes valid. Accordingly, in the case where the shutter speed dial 110 is rotationally operated, it is possible to switch the shutter speed.

In a case where the switching between the locked state and the unlocked state is performed, the display color of the image picture Lb of the lock button is switched (step S22). That is, the display color is inverted.

Figure 13B:
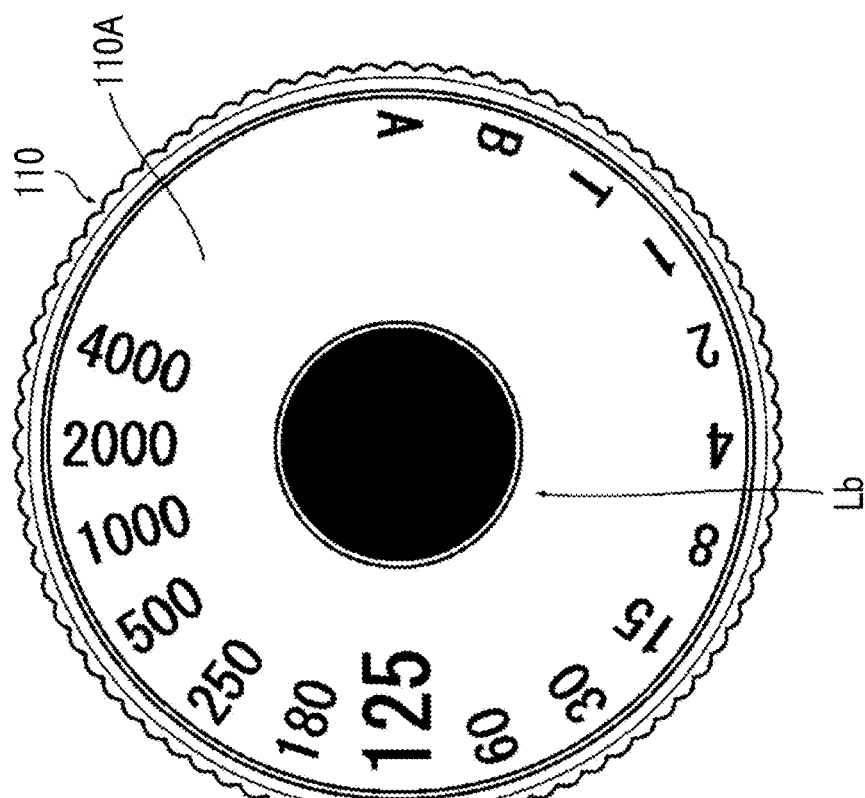
FIGS. 13A and 13B are plan views showing display examples of dial plate images in a case where the unlocked state is set and in a case where the locked state is set.
Figure 13A:
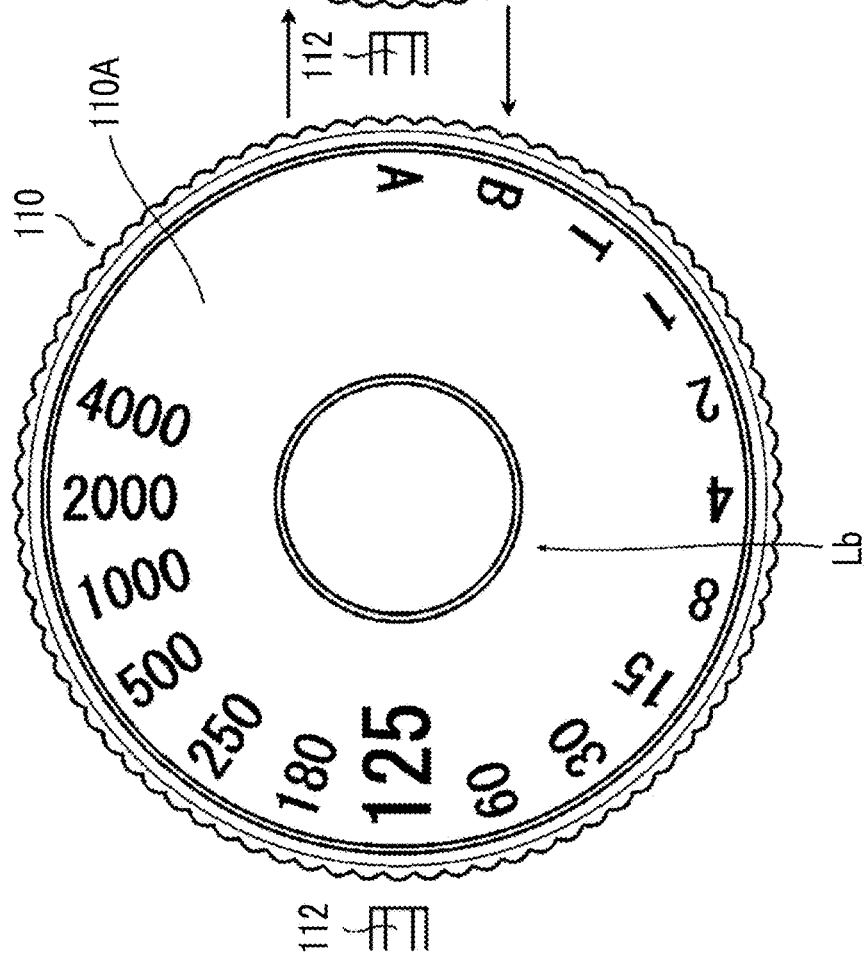

FIGS. 13A and 13B are plan views showing display examples of dial plate images in a case where the unlocked state is set and in a case where the locked state is set. FIG. 13A is the plan view showing the display example of the dial plate image in the case where the unlocked state is set. FIG. 13B is the plan view showing the display example of the dial plate image in the case where the locked state is set.

In the case where the unlocked state is set as shown in FIG. 13A, the inner side of a frame line indicating the outline of the lock button is displayed in white in the image picture Lb of the lock button.

On the other hand, in the case where the locked state is set as shown in FIG. 13B, the inner side of the frame line indicating the outline of the lock button is displayed in black in the image picture Lb of the lock button.

In this manner, it is possible to clarify a current setting state by switching the image picture Lb of the lock button according to the switching between the locked state and the unlocked state. Accordingly, it is possible to clarify whether the locked state is set or the unlocked state is set and thus to obtain better operability.

Then, it is determined whether the power supply is turned off (step S23). In a case where the power supply is turned off, a current setting is stored in the data memory 64 (step S24), and the processing ends.

As described above, with the shutter speed setting device 100 of the embodiment, it is possible to lock and unlock the switching of the shutter speed by touching the upper surface of the shutter speed dial 110 with a finger. Accordingly, it is possible to appropriately prevent an erroneous operation.

Further, the switching between the locked state and the unlocked state is performed by the toggle type, it is possible to easily switch between the locking and the unlocking.

Further, in the case where the shutter speed dial 110 is rotationally operated during the unlocking, since the display section 110A is not hidden by a finger, it is possible to easily perform a setting operation of the shutter speed.

Further, since the locking and the unlocking are performed electronically not by a mechanical mechanism, it is possible to simplify a structure of the shutter speed dial 110.

Furthermore, since the image picture Lb of the lock button is displayed on the display section 110A, the operation can be intuitively performed and thus even for a user who uses the shutter speed dial for the first time can use the dial without being confused. In addition, since the image picture Lb of the lock button is displayed on the center of the display section 110A, the operation can be intuitively performed and thus even for a user who uses the operation dial for the first time can use the dial without being confused.

Modification Example

<Other Setting Devices>

In the above-described embodiment, the case where the invention is applied to the setting device of the shutter speed is described, but the application of the invention is not limited thereto.

(1) Setting Device of Sensitivity

Figure 14:
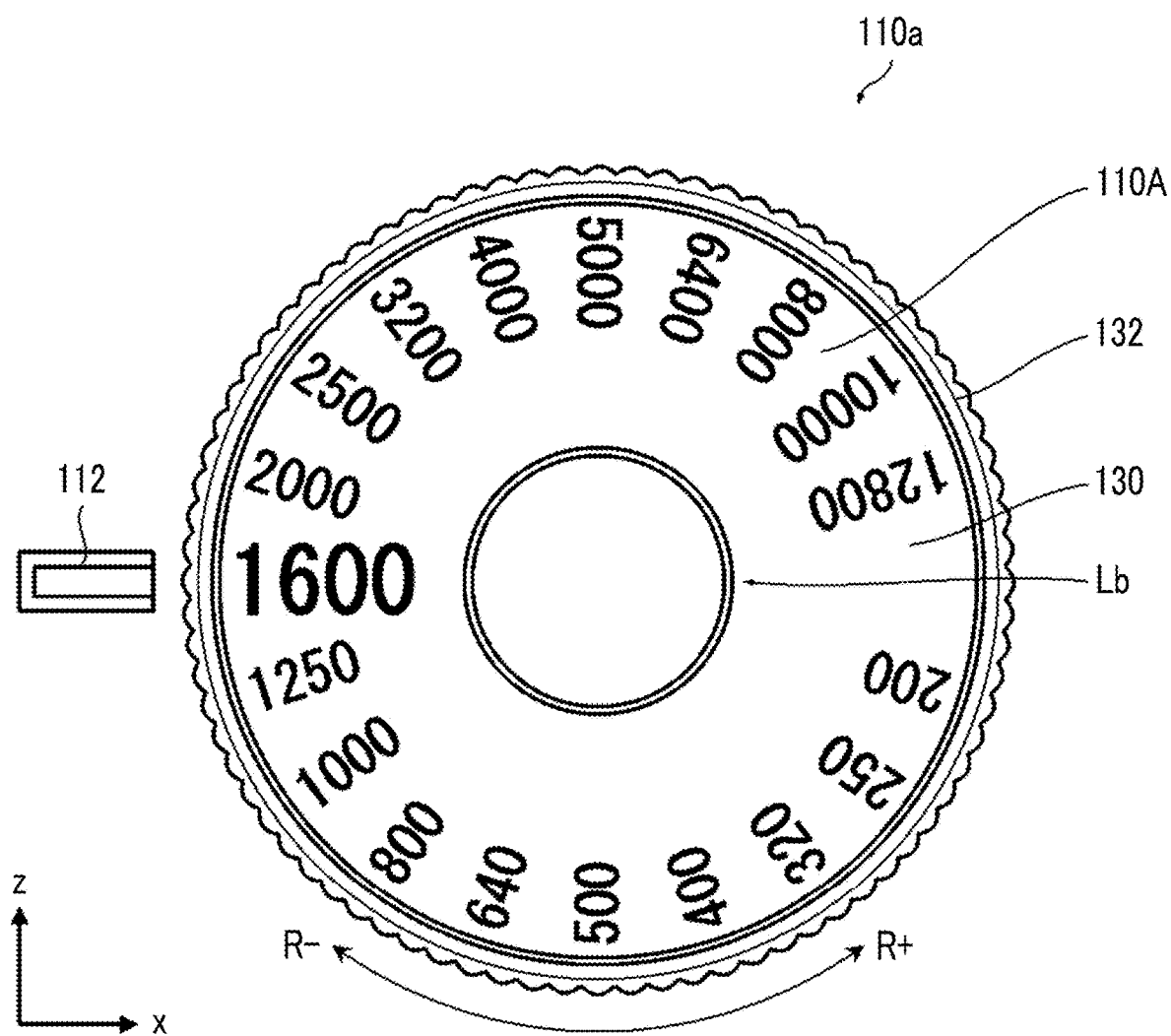
FIG. 14 is a plan view showing a display example of a dial plate image in a case of being applied to the setting device of sensitivity.

FIG. 14 is a plan view showing a display example of a dial plate image in a case where the invention is applied to the setting device of sensitivity.

In the case of being applied to the setting device of the sensitivity, settable pieces of sensitivity are displayed on the display section 110A of a sensitivity dial 110*a* which is the operation dial.

FIG. 14 shows a display example of the dial plate image in a case where international organization for standardization sensitivity (ISO) is set with a step width of ⅓ stage from ISO200 to ISO12800. In this case, ISO sensitivity can be set by selecting any of ISO200, ISO250, ISO320, ISO400, ISO500, ISO640, ISO800, ISO1000, ISO1250, ISO1600, ISO2000, ISO2500, ISO3200, ISO4000, ISO5000, ISO6400, ISO8000, ISO10000, or ISO12800.

As shown in FIG. 14, in the case of being applied to the setting device of the sensitivity, the image picture Lb of the lock button is also displayed in the center portion on the display section 110A of the sensitivity dial 110*a*.

Figure 15B:
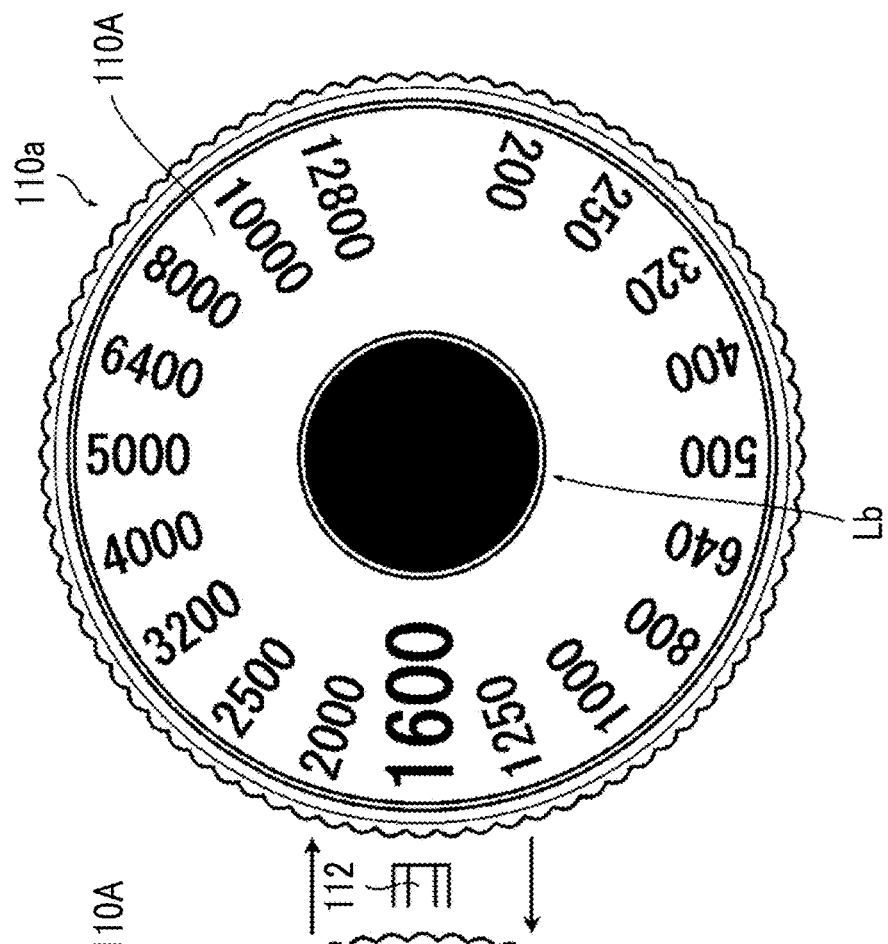
FIGS. 15A and 15B are plan views showing display examples of dial plate images in a case where the unlocked state is set and in a case where the locked state is set.
Figure 15A:
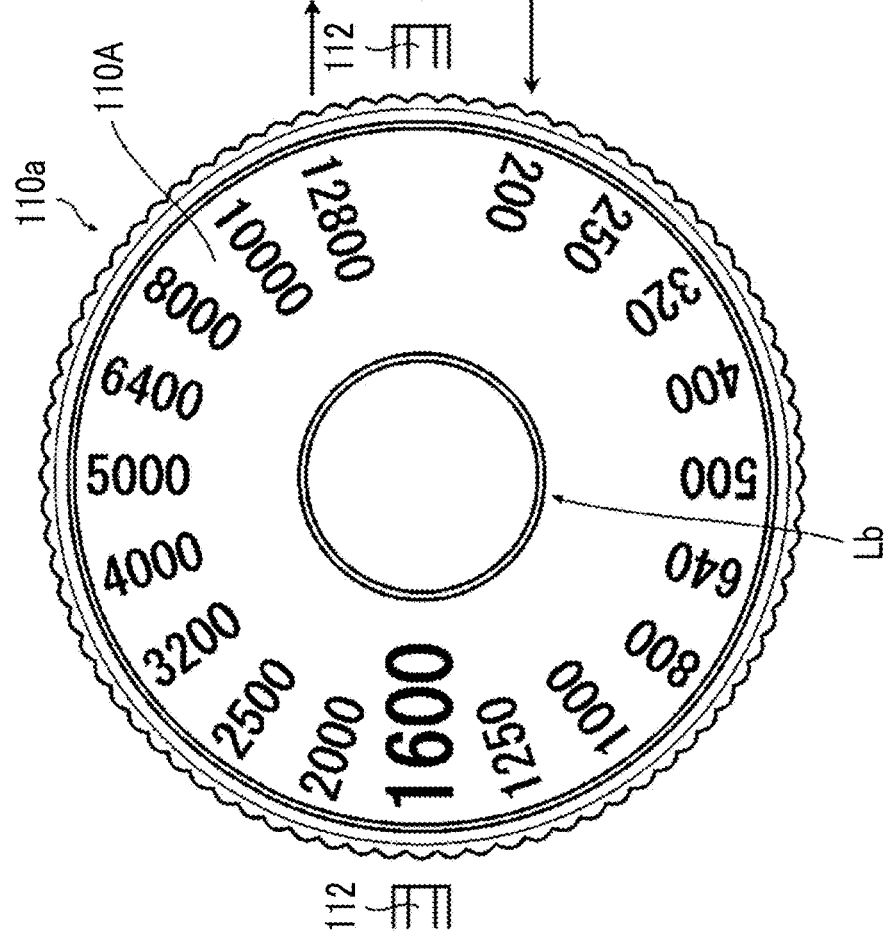

FIGS. 15A and 15B are plan views showing display examples of dial plate images in a case where the unlocked state is set and in a case where the locked state is set. FIG. 15A is the plan view showing the display example of the dial plate image in the case where the unlocked state is set. FIG. 15B is the plan view showing the display example of the dial plate image in the case where the locked state is set.

In the case where the unlocked state is set as shown in FIG. 15A, the inner side of the frame line indicating the outline of the lock button is displayed in white in the image picture Lb of the lock button.

On the other hand, in the case where the locked state is set as shown in FIG. 15B, the inner side of the frame line indicating the outline of the lock button is displayed in black in the image picture Lb of the lock button.

(2) Setting Device of Exposure Correction Value

Figure 16:
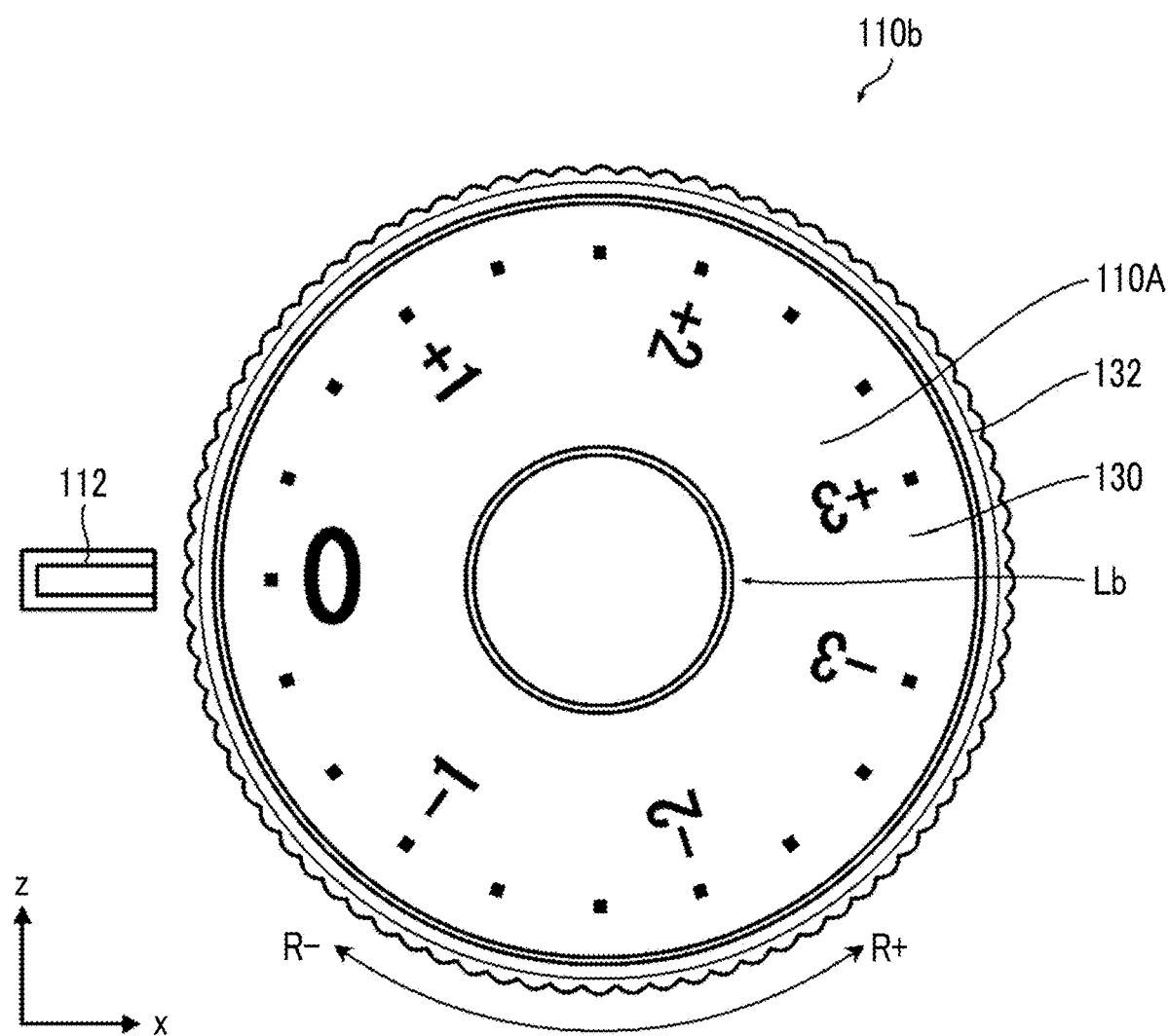
FIG. 16 is a plan view showing a display example of a dial plate image in a case of being applied to the setting device of an exposure correction value.

FIG. 16 is a plan view showing a display example of a dial plate image in a case where the invention is applied to the setting device of an exposure correction value.

In the case of being applied to the setting device of the exposure correction value, settable exposure correction values are displayed on the display section 110A of an exposure correction dial 110*b* which is the operation dial.

FIG. 16 displays the display example of the dial plate image in a case where the exposure correction value is set with the step width of ⅓ stage from −3 to +3. In this case, the exposure correction value can be set by selecting any of −3, −2.2/3, −2.1/3, −2, −1.2/3, −1.1/3, −1, −⅔, −⅓, 0, +⅓, +⅔, +1, +1.1/3, +1.2/3, +2, +2.1/3, +2.2/3, or +3. The settable exposure correction values between −3 and −2, between −2 and −1, between −1 and 0, between 0 and +1, between +1 and +2, and between +2 and +3 are respectively displayed by dots.

As shown in FIG. 16, in the case of being applied to the setting device of the exposure correction value, the image picture Lb of the lock button is also displayed in the center portion on the display section 110A of the exposure correction dial 110*b*.

Figure 17A:
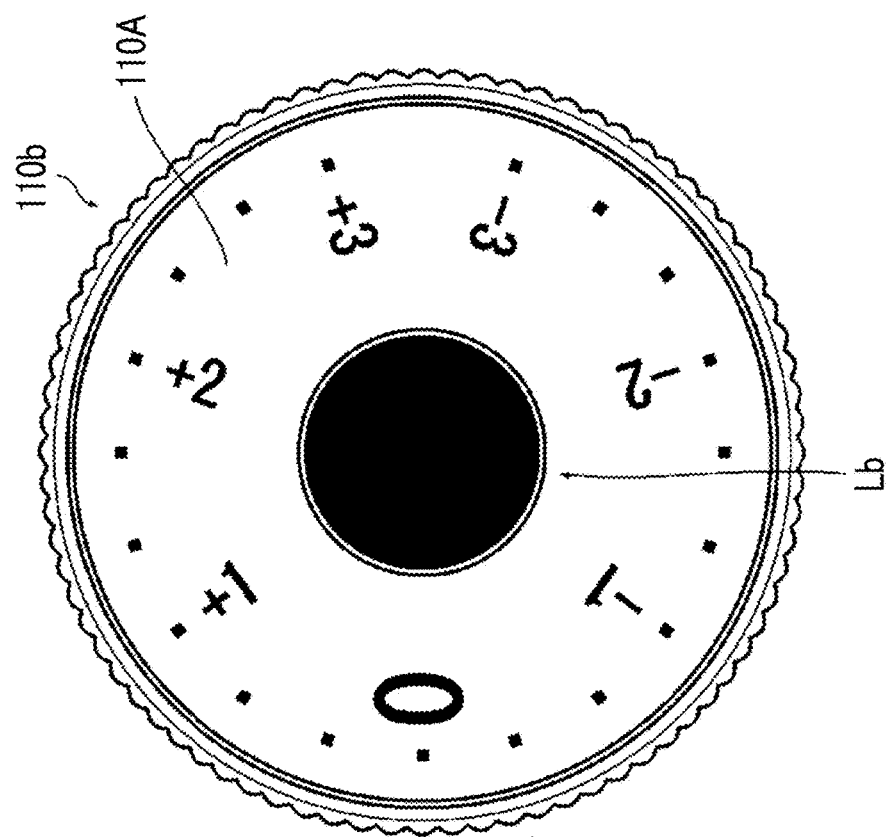
FIGS. 17A and 17B are plan views showing display examples of dial plate images in a case where the unlocked state is set and in a case where the locked state is set.
Figure 17B:
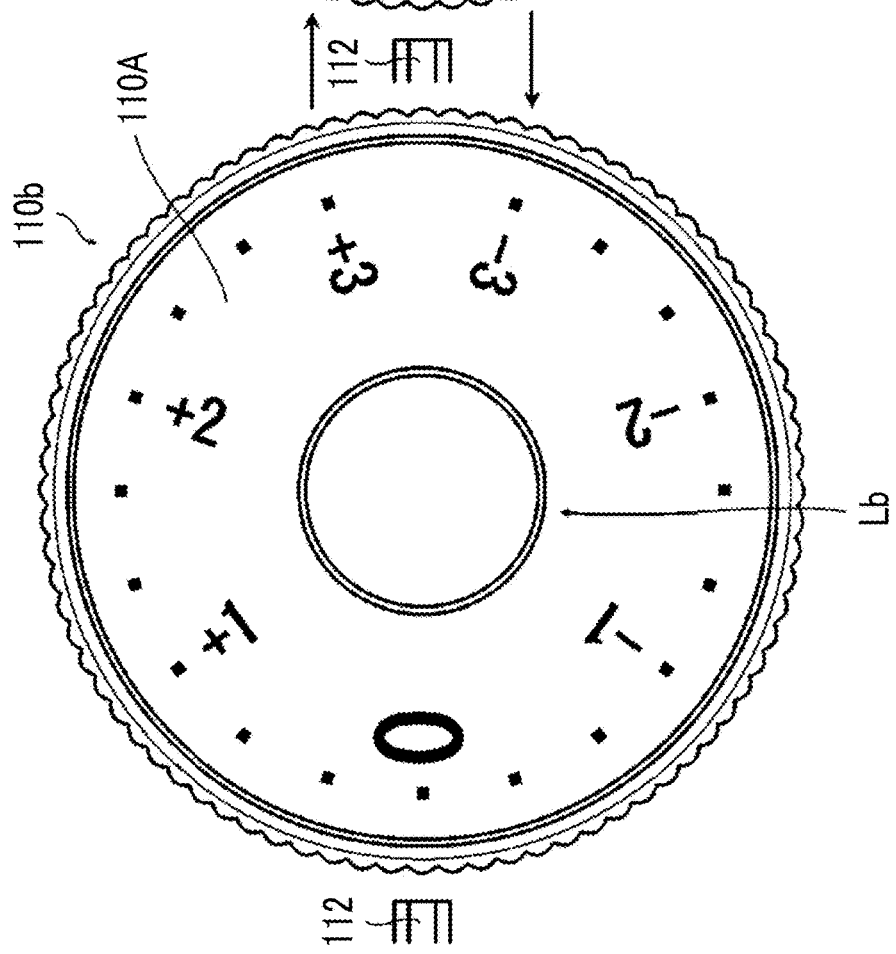

FIGS. 17A and 17B are plan views showing display examples of dial plate images in a case where the unlocked state is set and in a case where the locked state is set. FIG. 17A is the plan view showing the display example of the dial plate image in the case where the unlocked state is set. FIG. 17B is the plan view showing the display example of the dial plate image in the case where the locked state is set.

In the case where the unlocked state is set as shown in FIG. 17A, the inner side of the frame line indicating the outline of the lock button is displayed in white in the image picture Lb of the lock button.

On the other hand, in the case where the locked state is set as shown in FIG. 17B, the inner side of the frame line indicating the outline of the lock button is displayed in black in the image picture Lb of the lock button.

(3) Setting Device of Imaging Mode

Figure 18:
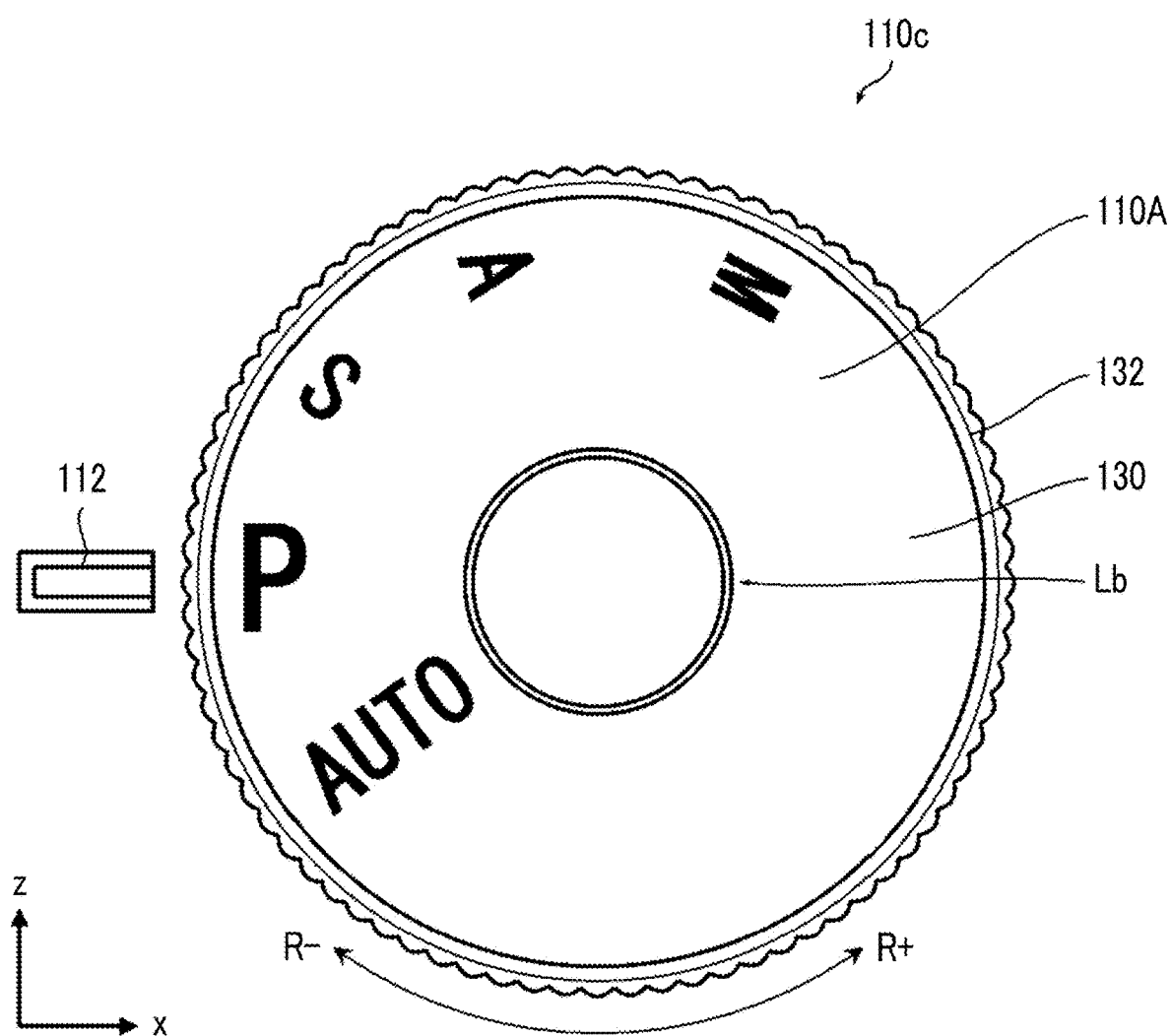
FIG. 18 is a plan view showing a display example of a dial plate image in a case of being applied to the setting device of an imaging mode.

FIG. 18 is a plan view showing a display example of a dial plate image in a case where the invention is applied to the setting device of the imaging mode.

In the case of being applied to the setting device of the imaging mode, settable imaging modes are displayed on the display section 110A of a mode dial 110*c* which is the operation dial.

FIG. 18 shows the display example of the dial plate image in a case where auto, program, shutter speed priority, aperture stop priority, and manual are prepared as the selectable imaging modes.

Here, the auto refers to a mode in which the camera automatically decides an F-number and a shutter speed such that the proper exposure is achieved. The auto is displayed as "AUTO" on the display section 110A.

Further, the program refers to a mode in which an imaging person can change a combination of the F-number and the shutter speed while the exposure is constantly maintained. The mode is an imaging mode in which so-called program shift is possible. The program is displayed as "P" on the display section 110A.

The shutter speed priority refers to a mode in which the camera automatically decides an F-number such that the proper exposure is achieved for a shutter speed selected by the user. The shutter speed priority is displayed as "S" on the display section 110A.

The aperture stop priority refers to a mode in which the camera automatically decides a shutter speed such that the proper exposure is achieved for an F-number selected by the user. The aperture stop priority is displayed as "A" on the display section 110A.

The manual refers to a mode in which the user selects the shutter speed and the F-number. The manual is displayed as "M" on the display section 110A.

In a case where the mode dial 110c is rotated in the plus direction R+, the imaging mode is switched in order of auto (AUTO), program (P), shutter speed priority (S), aperture stop priority (A), and manual (M) every one click.

As shown in FIG. 18, in the case of being applied to the setting device of the imaging mode, the image picture Lb of the lock button is also displayed in the center portion on the display section 110A of the mode dial 110c.

Figure 19B:
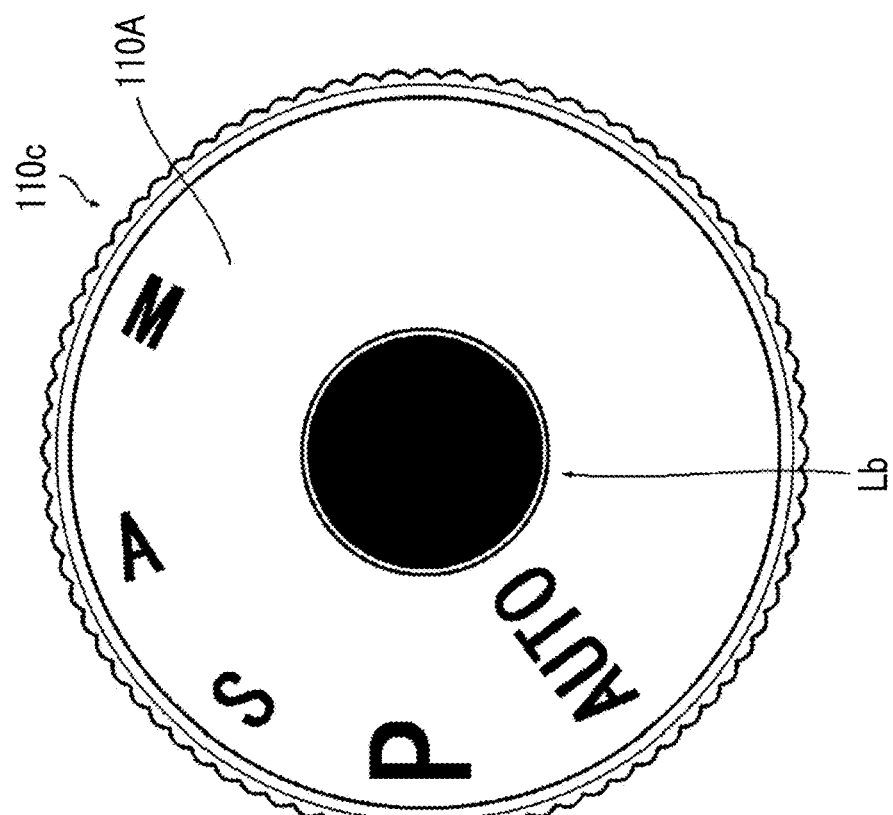
FIGS. 19A and 19B are plan views showing display examples of dial plate images in a case where the unlocked state is set and in a case where the locked state is set.
Figure 19A:
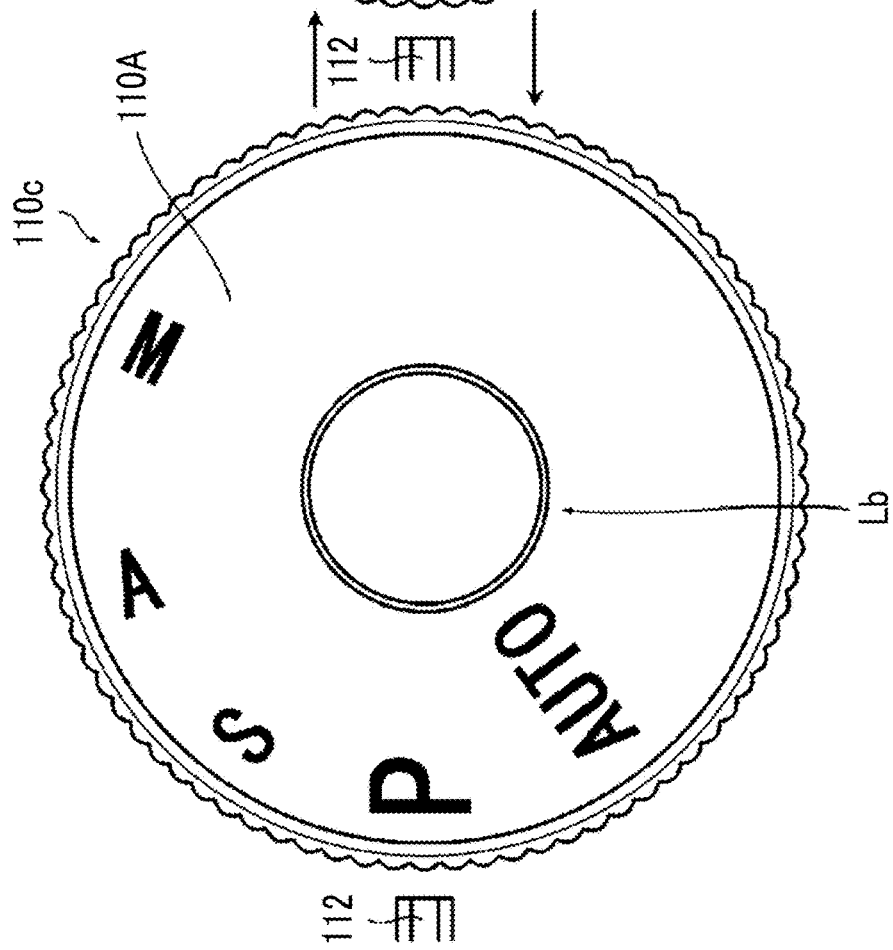

FIGS. 19A and 19B are plan views showing display examples of dial plate images in a case where the unlocked state is set and in a case where the locked state is set. FIG. 19A is the plan view showing the display example of the dial plate image in the case where the unlocked state is set. FIG. 19B is the plan view showing the display example of the dial plate image in the case where the locked state is set.

In the case where the unlocked state is set as shown in FIG. 19A, the inner side of the frame line indicating the outline of the lock button is displayed in white in the image picture Lb of the lock button.

On the other hand, in the case where the locked state is set as shown in FIG. 19B, the inner side of the frame line indicating the outline of the lock button is displayed in black in the image picture Lb of the lock button.

In this manner, the invention can be applied to various setting devices by using rotary operation dials. In addition, for example, the invention can be applied to a setting device that sets volume by using the rotary operation dial or the like.

The user may select the functions to be assigned to the operation dial. For example, the user may select the function as the shutter speed dial, the function as the sensitivity dial, and the function as the exposure correction dial. In this case, the selection of the functions to be assigned to the operation dial is performed by the menu screen or the like. Alternatively, a dedicated switching button may be provided, and an assigned function may be switched every time the button is pressed.

Modification Example of Contact Detection Unit

In the above-described embodiment, the contact detection unit is formed of the touch sensor, but the configuration of the contact detection unit is not limited thereto. A configuration at least capable of detecting the contact with a display section of the image picture Lb of the lock button may be employed. Accordingly, In a case where the portion of the image picture Lb of the lock button is touched, it is possible to firmly switch between the locked state and the unlocked state and thus to realize a stable operation.

A configuration of detecting only the contact with the portion of the image picture Lb of the lock button may be also employed. In this case, the detection region of the contact by the contact detection unit is limited to a region corresponding to a display region of the image picture Lb of the lock button.

Figure 20:
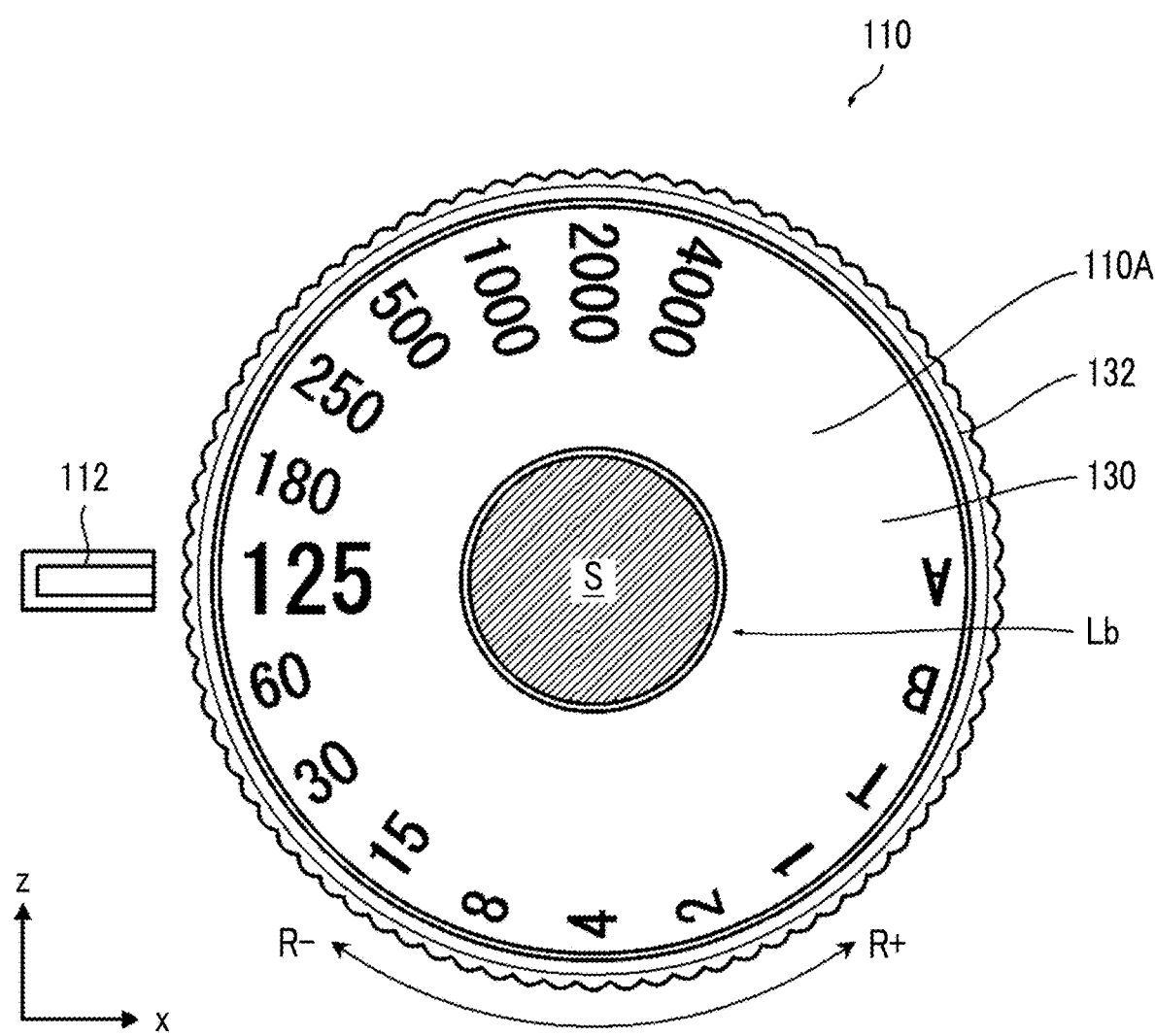
FIG. 20 is a conceptual diagram in a case of limiting a detection region of contact by a contact detection unit.

FIG. 20 is a conceptual diagram in a case of limiting the detection region of the contact by the contact detection unit. In FIG. 20, a region S indicated by diagonal lines is a detection region of the touch sensor 136 which is the contact detection unit.

As shown in FIG. 20, the detection region S of the touch sensor 136 which is the contact detection unit is set to a region corresponding to the display region of the image picture Lb of the lock button. Accordingly, only a region where the image picture Lb of the lock button is displayed can be set as the detection region of the contact.

In this manner, it is possible to appropriately prevent the erroneous operation by setting only the region where the image picture Lb of the lock button is displayed as the detection region S of the contact. That is, since only the region where the image picture Lb of the lock button is displayed is set as the detection region S of the contact, the locked state and the unlocked state are not switched even in a case of mistakenly touching another region and thus it is possible to realize the stable operation.

Further, the contact detection unit may detect so-called long-press. That is, the contact detection unit may detect that the contact is continued for a period of time. For example, it is assumed that the contact is detected continuously for second seconds or more, and then the locked state and the unlocked state are switched. Accordingly, it is possible to eliminate instantaneous contact and to stably operate the switching. The user may randomly set a time to recognize the long-press as "contact".

In addition, a plurality of times of continuous contacts may be detected. That is, a case where a plurality of times of taps are performed may be detected. For example, two times of taps may be detected, and then the locked state and the unlocked state may be switched. The user may randomly set the number of times to recognize the tap as "contact".

Other Examples of Display Forms of Locked State and Unlocked State

In the above-described embodiment, the display color of the image picture Lb of the lock button between the locked state and the unlocked state is switched, but the display form for distinguishing between the locked state and the unlocked state is not limited thereto.

In addition, for example, a form of switching a background color of the dial plate image between the locked state and the unlocked state, of switching the brightness of the dial plate image between the locked state and the unlocked state, of displaying a character of "LOCK" in the image picture of the lock button in the case of the locked state, of turning on and off the image picture of the lock button in the case of the locked state, or the like may be employed.

<Method of Notifying Locked State>

(1) Notification by Sound

In a case where the digital camera 1 comprises a sound output unit such as a speaker, the user may be notified that the locked state is set by using the sound output unit. For example, in the case where the locked state is set, in the case where the operation dial is rotationally operated, a notification sound is assumed to output from the sound output unit. In this case, the digital camera 1 comprises a notification sound output control unit. In the case where the locked state is set, in the case where the operation dial is rotationally operated, the notification sound output control unit outputs the notification sound from the sound output unit. Thus, it is possible to further improve the operability.

Further, in the case where the digital camera 1 comprises the sound output unit such as the speaker, a pseudo-rotation operation sound may be output in conjunction with the rotation operation of the operation dial. In this case, the rotation operation sound between the locked state and the unlocked state may be switched.

(2) Notification on Monitor

The monitor 16 may display a setting state of the operation dial. Thus, it is possible to further improve the operability.

Figure 21:
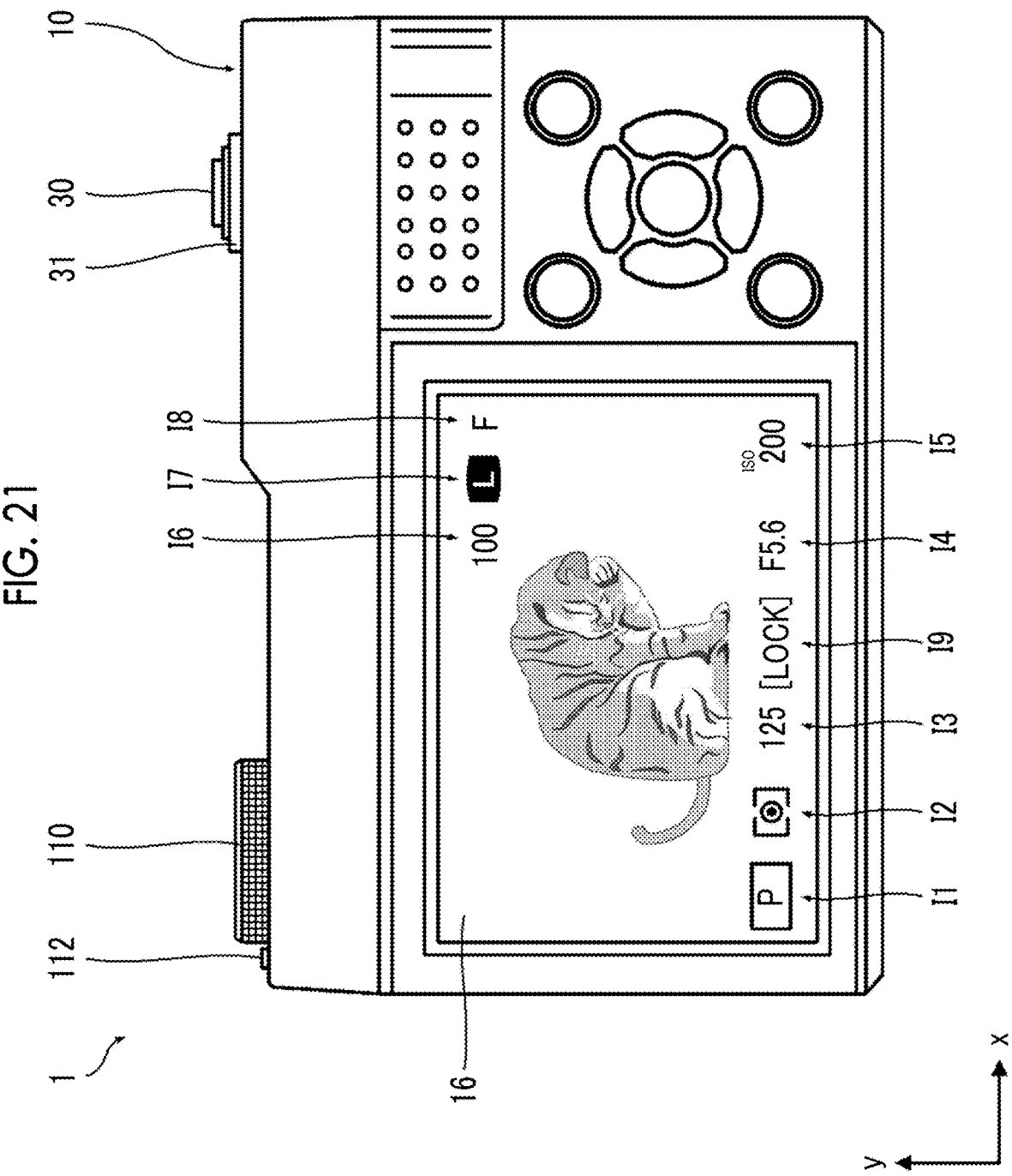
FIG. 21 is a back view showing an example in a case of displaying a setting state of an operation dial on a monitor.

FIG. 21 is a back view showing an example in a case of displaying the setting state of the operation dial on the monitor.

The live view image is displayed on the monitor 16 at the time of imaging, and various pieces of imaging information such as an imaging mode I1, a photometry mode I2, a shutter speed I3, an F-number I4, ISO sensitivity I5, the number of capturable images I6, an imaging size I7, and an image quality I8 are displayed together with the live view image. The above pieces of imaging information include the setting state of the operation dial.

The example shown in FIG. 21 shows a display example of the monitor 16 in a case where the shutter speed dial 110 which is the operation dial is set as the locked state. In the case where the locked state is set, an icon I9 of "LOCK" indicating that the locked state is set is displayed next to the shutter speed I3.

In the case of the unlocked state, the display of the icon I9 is deleted. That is, the icon I9 of "LOCK" is displayed on the monitor 16 only in the case where the locked state is set.

In this manner, the setting state of the operation dial is more clarified by indicating that the locked state is set on the monitor 16, and thus it is possible to further improve the operability.

The display shown in FIG. 21 is an example. In addition, various display forms such as the turning on and off of the display of the shutter speed in the case where the locked state is set and the switching of the display of the shutter speed to the icon display of "LOCK" in the case where the locked state is set may be employed.

Further, the display may be switched in conjunction with the rotation operation of the operation dial. For example, in the case where the locked state is set, in the case where the shutter speed dial 110 which is the operation dial is rotationally operated, the display forms such as the display of the icon of "LOCK", the turning on and off of the display of the shutter speed, and the switching of the display of the shutter speed to the icon display of "LOCK" may be employed.

In a case where the camera body comprises an electronic view finder, it is preferable to display the setting state of the operation dial also on the electronic view finder.

Modification Example of Display Form of Selection Item

In the above-described embodiment, in the case where the operation dial is used as the shutter speed dial, all the selectable shutter speeds are displayed on the display section 110A, but only a part of the selectable shutter speeds may be displayed.

Figure 22:
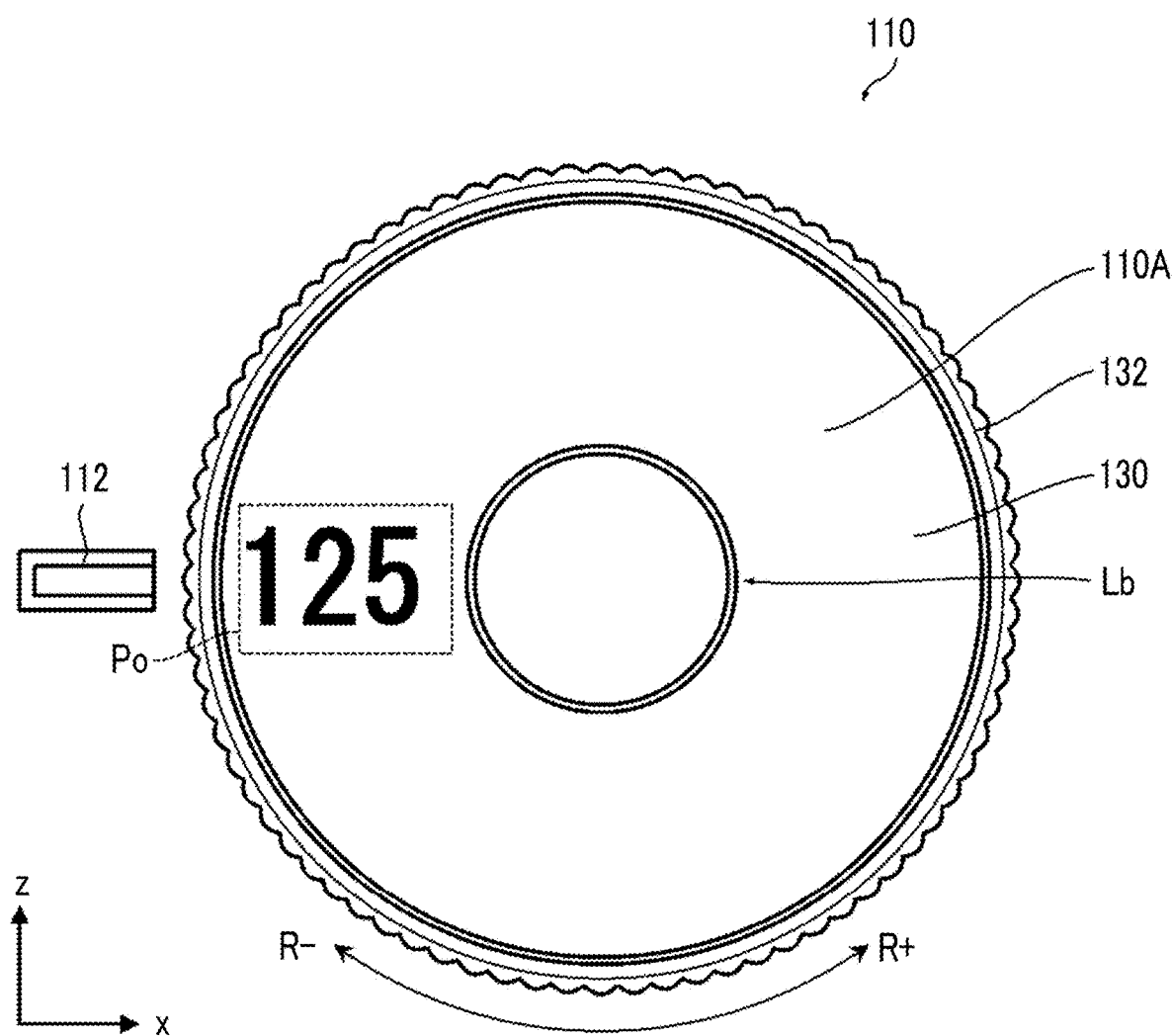
FIG. 22 is a plan view showing a display example of the display section in a case of displaying only a part of selectable settings on the display section.

FIG. 22 is a plan view showing a display example of the display section in a case of displaying only a part of selectable settings on the display section.

The example shown in FIG. 22 shows a case where only a currently selected shutter speed is displayed on the display section 110A. In this case, the currently selected shutter speed is displayed at the current setting display position Po.

Figure 23:
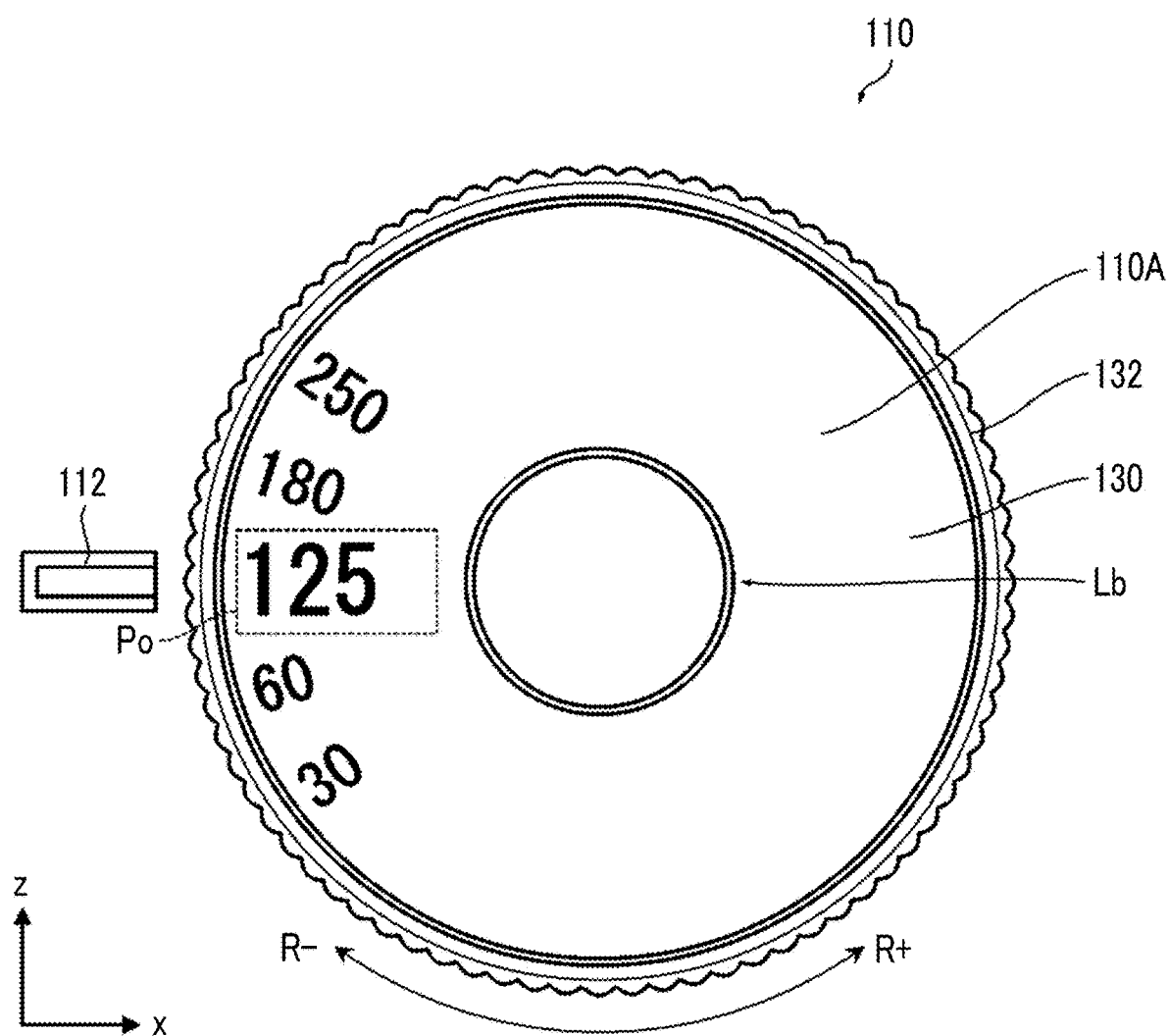
FIG. 23 is a plan view showing another display example of the display section in a case of displaying only a part of the selectable settings on the display section.

FIG. 23 is a plan view showing another display example of the display section in a case of displaying only a part of the selectable settings on the display section.

The example shown in FIG. 23 shows a case where the currently selected shutter speed and two shutter speeds before and after the currently selected shutter speed are displayed on the display section 110A. In this case, the currently selected shutter speed is displayed at the current setting display position Po, and a shutter speed set in a case where the shutter speed dial 110 is rotated by one click in the plus direction R+ and a shutter speed set in a case where the shutter speed dial 110 is rotated by two clicks in the plus direction R+ are displayed at regular intervals along the minus rotation direction R− with the current setting display position Po as the reference. Further, a shutter speed set in a case where the shutter speed dial 110 is rotated by one click in the minus direction R− and a shutter speed set in a case where the shutter speed dial 110 is rotated by two clicks in the minus direction R− are displayed at regular intervals along the plus rotation direction R+ with the current setting display position Po as the reference.

The example shown in FIG. 23 shows a case where the shutter speed $1/125$ second is selected. In this case, "125" indicating the shutter speed $1/125$ second is displayed at the current setting display position Po.

In the case where the shutter speed $1/125$ second is selected, the shutter speed is set to $1/180$ second in the case where the shutter speed dial 110 is rotated by one click in the plus direction R+. Further, in the case where the shutter speed dial 110 is rotated by two clicks in the plus direction R+, the shutter speed is set to $1/250$ second. Therefore, in this case, "180" and "250" are displayed at regular intervals along the minus rotation direction R− with the current setting display position Po as the reference.

Further, in the case where the shutter speed $1/125$ second is selected, the shutter speed is set to $1/60$ second in the case where the shutter speed dial 110 is rotated by one click in the minus direction R−. Further, in the case where the shutter speed dial 110 is rotated by two clicks in the minus direction R−, the shutter speed is set to $1/30$ second. Therefore, in this case, "60" and "30" are displayed at regular intervals along the plus rotation direction R+ with the current setting display position Po as the reference.

In this manner, it is possible to confirm a next settable shutter speed by displaying the currently selected shutter speed and the shutter speeds before and after the currently selected shutter speed, and thus to further improve the operability.

Such display form is particularly effective in a case where a display area of the display section 110A is small.

Figure 24:
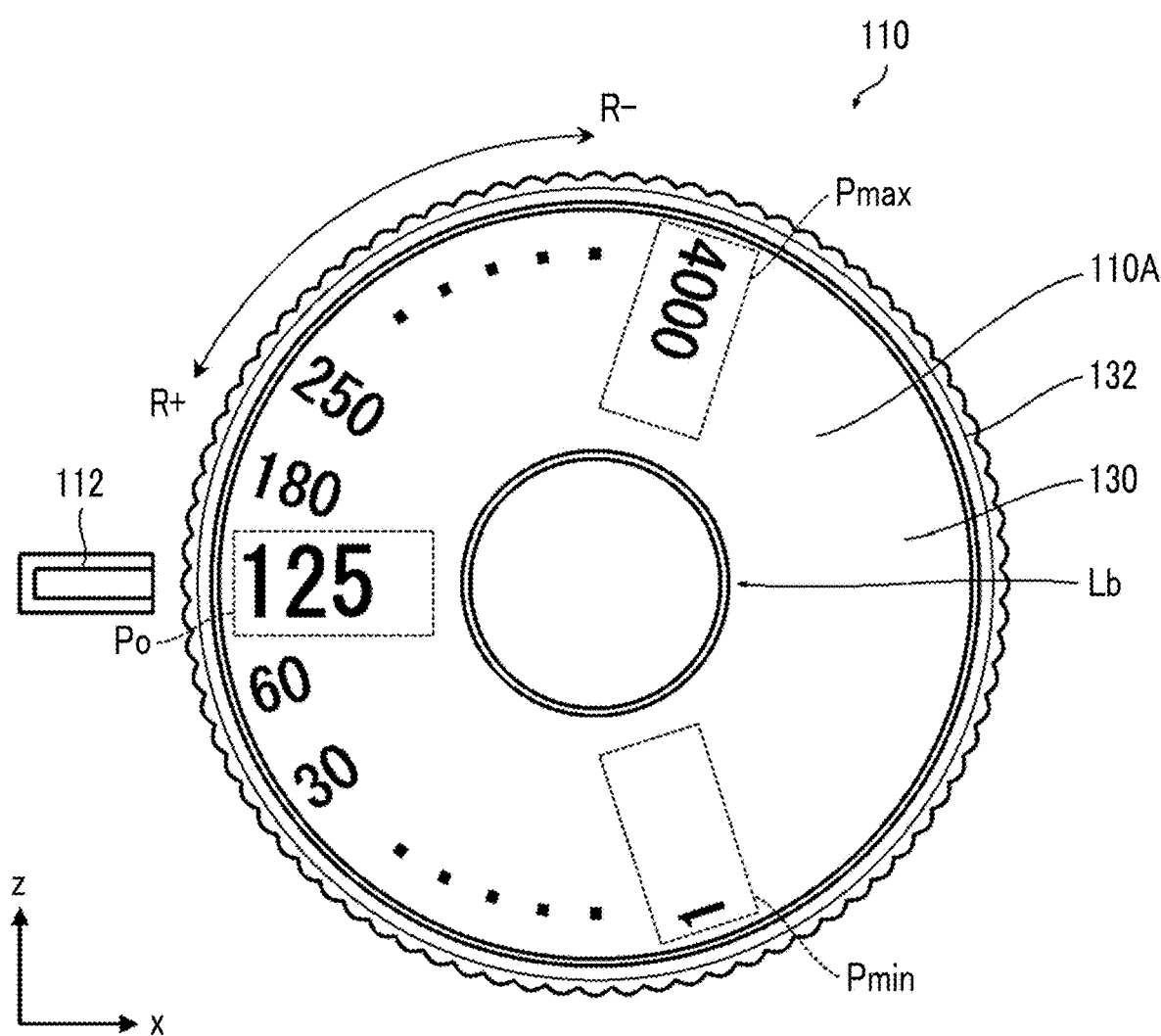
FIG. 24 is a plan view showing still another display example of the display section in a case of displaying only a part of the selectable settings on the display section.

FIG. 24 is a plan view showing still another display example of the display section in a case of displaying only a part of the selectable settings on the display section.

The example shown in FIG. 24 shows a case where a maximum value and a minimum value of the settable shutter speeds are displayed on the display section 110A in addition to the currently selected shutter speed and the two shutter speeds before and after the currently selected shutter speed.

The maximum value of the settable items is displayed at a maximum value-display position Pmax, and the minimum value thereof is displayed at a minimum value-display position Pmin. The maximum value-display position Pmax is set on the upper stream side of plus rotation direction R+ with the current setting display position Po as the reference, and the minimum value-display position Pmin is set on the upper stream side of the minus rotation direction R− with the current setting display position Po as the reference.

The example shown in FIG. 24 shows a case where the maximum value of the settable shutter speeds is $1/4000$ second and the minimum value thereof is 1 second. In this case, "4000" is displayed at the maximum value-display position Pmax and "1" is displayed at the minimum value-display position Pmin. Further, in the example shown in FIG. 24, the intermediate thinned-out shutter speeds are indicated by dots.

In this manner, it is possible to easily grasp a settable range by displaying the settable maximum value and minimum value and thus to further improve the operability.

<Forms of Display Section>

In the above-described embodiment, the shape of the display section provided in the operation dial is circular, but the shape of the display section is not limited thereto. For example, the shape thereof may be rectangular or polygonal.

Figure 25:
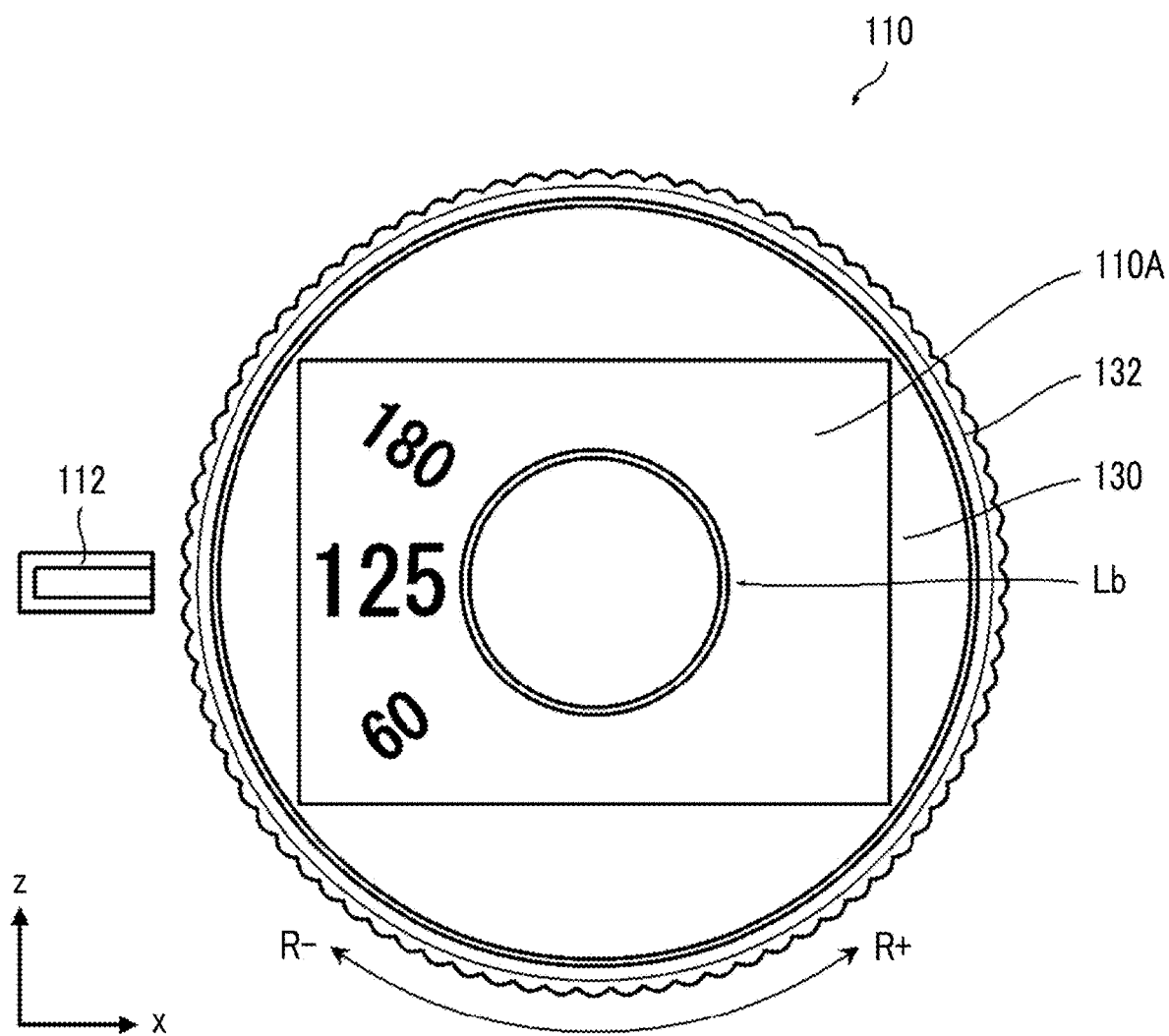
FIG. 25 is a plan view of the shutter speed dial having a rectangular display section.

FIG. 25 is a plan view of the shutter speed dial having a rectangular display section.

In the shutter speed dial 110 shown in FIG. 25, the display 130 has a rectangular display surface, and the display surface of the display 130 forms the display section 110A of the shutter speed dial 110.

In the example shown in FIG. 25, the shutter speeds displayed on the display section 110A is limited to a certain range. That is, only the currently selected shutter speed and the shutter speeds before and after the currently selected shutter speed are displayed on the display section 110A.

In this manner, the shape of the display section 110A is not necessarily required to have a shape matching the inner peripheral shape of the operation ring 132, and various shapes may be employed.

Other Examples of Display Section

In the above-described embodiment, the display forming the display section is the LCD, but the display forming the display section is not limited thereto. In addition, the display may be formed of a self-luminous display or the like such as electronic paper, a memory liquid crystal display, or an organic electroluminescent display (EL).

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the display section can be confirmed even in a case where the power supply of the camera is turned off.

Further, in a case where the display is formed of the LCD, it is possible to ensure good visibility even in an environment where surroundings are bright by employing a reflective LCD as the display. In the case where the display is formed of the reflective LCD, it is preferable to comprise illumination.

Other Modification Examples

The rotation detection unit is formed of the rotary encoder in the above-mentioned embodiment, but the configuration of the rotation detection unit is not limited thereto. In addition, publicly known rotation detection means, which uses a rotary brush or the like, may also be employed.

Further, the click mechanism is formed of the click groove-metal plate and the click balls in the above-mentioned embodiment, but the configuration of the click mechanism is not limited thereto. In addition, publicly known click mechanism, which uses a leaf spring or the like, may also be employed.

Furthermore, the case where the invention is applied to the digital camera is described in the above-mentioned embodiment, but the application of the invention is not limited thereto. The invention may be applied similarly to a camera that uses a silver halide film. In addition, the invention may also be applied to an electronic apparatus in which a rotary operation dial is built.

Further, the case where the invention is applied to the lens-interchangeable camera is described in the above-mentioned embodiment, but the invention may also be applied similarly to a camera, which is integrated with a lens.

Furthermore, the case where the invention is applied to the non-reflex camera is described in the above-mentioned embodiment, but the invention may also be applied similarly to a reflex camera.

EXPLANATION OF REFERENCES

1: digital camera
2: lens
2a: lens drive unit
10: camera body
14: lens mount
16: monitor
22: grip
24: thumb rest
30: shutter button
31: power supply lever
32: playback button
33: imaging setting button
34: menu/OK button
35: selector button
36: display/BACK button
37: delete button
50: image sensor
52: image sensor drive unit
54: shutter
56: shutter drive unit
58: analog signal processing section
60: image data input unit
62: work memory
64: data memory
66: digital signal processing section
68: recording control unit
70: monitor drive unit
74: operation unit
78: memory card
80: system controller
100: shutter speed setting device
110: shutter speed dial
110a: sensitivity dial
110b: exposure correction dial
110c: mode dial
110A: display section
112: indicator
114: rotation detection unit
116: setting switching unit
118: display control unit
120: lock state switching unit
126: shutter speed dial support frame
126A: support frame main body
126A1: click ball-receiving hole
126B: display support frame
126B1: support part
126B2: base part
130: display
132: operation ring
132A: shaft portion
134: click mechanism
134A: click groove-metal plate
134B: click ball 134C: click spring
134a: click groove
136: touch sensor
140: bearing
142: display drive unit
I1: imaging mode
I2: photometry mode
I3: shutter speed
I4: F-number
I5: ISO sensitivity
I6: the number of capturable images
I7: imaging size
I8: image quality
I9: icon of "LOCK"
L: optical axis
Lb: image picture of lock button
Pmax: maximum value-display position
Pmin: minimum value-display position
Po: current setting display position
R+: plus direction
R−: minus direction
S: contact detection region
S10 to S17: procedure of setting processing of shutter speed
S20 to S24: processing procedure of switching between locked state and unlocked state

What is claimed is:

1. A setting device comprising:
a display section;
an operation ring that is rotatable along an outer periphery of the display section;
a touch sensor that detects contact with an upper surface of the display section;
a lock state switching unit that alternately switches between a locked state and an unlocked state in response to the contact with the upper surface of the display section is detected;
a rotation detection unit that detects a rotation of the operation ring;
a setting switching unit that sequentially switches a setting according to the rotation of the operation ring only in a case of the unlocked state; and
a display control unit that controls the display section and is configured to display information indicating whether the setting device is in the lock state or the unlocked state and a currently selected setting.

2. The setting device according to claim 1,
wherein the display control unit is configured to display an image picture of a lock button as the information indicating the lock state, and
wherein the touch sensor detects a contact with the image picture of the lock button displayed on the display section.

3. The setting device according to claim 1,
wherein the touch sensor detects the contact with a region corresponding to a region where the information indicating the lock state is displayed on the display section.

4. The setting device according to claim 2,
wherein the touch sensor detects the contact with a region corresponding to a region where the image picture of the lock button is displayed on the display section.

5. The setting device according to claim 1,
wherein the display control unit is configured to switch a display form of the display section between the locked state and the unlocked state.

6. The setting device according to claim 2,
wherein the display control unit is configured to switch a display form of the display section between the locked state and the unlocked state.

7. The setting device according to claim 3,
wherein the display control unit is configured to switch a display form of the display section between the locked state and the unlocked state.

8. The setting device according to claim 4,
wherein the display control unit is configured to switch a display form of the display section between the locked state and the unlocked state.

9. The setting device according to claim 5,
wherein the display control unit is configured to switch the image picture of the lock button between the locked state and the unlocked state.

10. The setting device according to claim 6,
wherein the display control unit is configured to switch the image picture of the lock button between the locked state and the unlocked state.

11. The setting device according to claim 7,
wherein the display control unit is configured to switch the image picture of the lock button between the locked state and the unlocked state.

12. The setting device according to claim 8,
wherein the display control unit is configured to switch the image picture of the lock button between the locked state and the unlocked state.

13. The setting device according to claim 9,
wherein the display control unit is configured to switch a color of the image picture of the lock button between the locked state and the unlocked state.

14. The setting device according to claim 10,
wherein the display control unit is configured to switch a color of the image picture of the lock button between the locked state and the unlocked state.

15. The setting device according to claim 1,
wherein the display control unit controls the display section so as to display the information indicating the lock state on a rotation center of the operation ring and to display the currently selected setting at a current setting display position.

16. The setting device according to claim 15,
wherein the display control unit is configured to display the currently selected setting displayed at the current setting display position and selectable settings side by side on the same circumference.

17. The setting device according to claim 15,
wherein the display control unit is configured to display the currently selected setting displayed at the current setting display position larger than other selectable settings.

18. A camera comprising:
the setting device according to claim 1.

19. The camera according to claim 18, further comprising:
a sound output unit that notifies by a sound that the locked state is set in a case where the operation ring is rotated in a case of the locked state.

20. The camera according to claim 18, further comprising:
a monitor that displays that the locked state is set in a case of the locked state.

* * * * *